US012633136B2

(12) United States Patent
Qu et al.

(10) Patent No.: US 12,633,136 B2
(45) Date of Patent: May 19, 2026

(54) LANE LINE DETECTION METHOD, RELATED DEVICE, AND COMPUTER-READABLE STORAGE MEDIUM

(71) Applicant: HUAWEI TECHNOLOGIES CO., LTD., Shenzhen (CN)

(72) Inventors: Zhan Qu, Shenzhen (CN); Huan Jin, Shenzhen (CN); Han Xia, Shenzhen (CN); Fengchao Peng, Shenzhen (CN); Zhen Yang, Shanghai (CN); Wei Zhang, London (GB)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 450 days.

(21) Appl. No.: 18/180,274

(22) Filed: Mar. 8, 2023

(65) Prior Publication Data

US 2023/0215191 A1     Jul. 6, 2023

Related U.S. Application Data

(63) Continuation of application No. PCT/CN2020/114289, filed on Sep. 9, 2020.

(51) Int. Cl.
 *G06V 20/56*     (2022.01)
 *G06T 7/73*     (2017.01)
     (Continued)

(52) U.S. Cl.
 CPC .............. *G06V 20/588* (2022.01); *G06T 7/73* (2017.01); *G06V 10/22* (2022.01); *G06V 10/7715* (2022.01); *G06T 2207/30256* (2013.01)

(58) Field of Classification Search
 CPC ...... G06V 10/26; G06V 10/225; G06V 20/41; G06V 10/267; G06V 20/56; G06V 20/588;
     (Continued)

(56) References Cited

U.S. PATENT DOCUMENTS

2015/0055831 A1     2/2015  Kawasaki et al.
2016/0155011 A1*    6/2016  Sulc .................... G06V 10/757
                                                    382/103
     (Continued)

FOREIGN PATENT DOCUMENTS

CN          103839264 A      6/2014
CN          105893949 A  *   8/2016   ....... G06F 18/23213
     (Continued)

OTHER PUBLICATIONS

English Translation—CN-105893949-A (Year: 2016).*
     (Continued)

*Primary Examiner* — Sumati Lefkowitz
*Assistant Examiner* — Aaron Joseph Sorrin
(74) *Attorney, Agent, or Firm* — WOMBLE BOND DICKINSON (US) LLP

(57) ABSTRACT

A method comprises: first, obtaining a to-be-recognized lane line image; then determining, based on the lane line image, a candidate pixel used to recognize a lane line region, to obtain a candidate point set, where the lane line region is a region of a location of a lane line in the lane line image and a surrounding region of the location of the lane line; then selecting a target pixel from the candidate point set, and obtaining at least three location points associated with the target pixel in a neighborhood, where the at least three location points are on one lane line; and finally, performing extension by using the target pixel as a start point and based on the at least three location points associated with the target
     (Continued)

pixel, to obtain a lane line point set corresponding to the target pixel.

15 Claims, 23 Drawing Sheets

(51) Int. Cl.
   *G06V 10/22*       (2022.01)
   *G06V 10/77*       (2022.01)
(58) Field of Classification Search
   CPC .... G06V 10/22; G06V 10/7715; G06V 10/25; G06F 18/23; G05D 1/0088; G05D 1/00; G06T 2207/30256; G06T 7/10; G06T 7/11; G06T 7/12; G06T 7/73
   See application file for complete search history.

(56) References Cited

U.S. PATENT DOCUMENTS

| | | | | |
|---|---|---|---|---|
| 2019/0156128 A1* | 5/2019 | Zhang | ................... | G08G 1/167 |
| 2020/0272835 A1* | 8/2020 | Cheng | .................. | B60W 50/14 |

FOREIGN PATENT DOCUMENTS

| | | | | | |
|---|---|---|---|---|---|
| CN | 107697154 A | * | 2/2018 | .......... | B62D 5/0463 |
| CN | 109583280 A | | 4/2019 | | |
| CN | 109740469 A | | 5/2019 | | |
| CN | 111126106 A | * | 5/2020 | .......... | G06V 20/588 |
| WO | 2019228211 A1 | | 12/2019 | | |

OTHER PUBLICATIONS

English Translation—CN-111126106-A (Year: 2020).*

English Translation—CN-107697154-A (Year: 2018).*

Davy Neven et al:"Towards End-to-End Lane Detection: an Instance Segmentation Approach." arXiv: 1802.05591v1 [cs.CV] Feb. 15, 2018. total 7 pages.

Jonah Philion:"FastDraw: Addressing the Long Tail of Lane Detection by Adapting a Sequential Prediction Network." arXiv: 1905.04354v2 [cs.CV] May 14, 2019. total 10 pages.

Zhenpeng Chen et al:"PointLaneNet: Efficient end-to-end CNNs for Accurate Real-Time Lane Detection." 2019 IEEE Intelligent Vehicles Symposium (IV) Paris, France. Jun. 9-12, 2019. total 6 pages.

Zhe Cao et al:"Realtime Multi-Person 2D Pose Estimation using Part Affinity Fields." arXiv: 1611.08050v2 [cs.CV] Apr. 14, 2017. total 9 pages.

AutoCAD Application Complete 2012 Chinese Version,China youth press,Dec. 31, 2014,with English abstract total 733 pages.

Baozhi Wei:"Analysis of Hot Technology Patents",Chinese version library CIP data nuclear No. 2018 No. 282943,Jan, 2019,with English abstract total 3 pages.

* cited by examiner

300

Lane line 1

Public vehicle

Lane line 2

Neighborhood of the target pixel

First location point

Lane line 3

Target pixel

Second location point

Third location point

Ego vehicle

Lane line 1

Lane line 2

Lane line 3

501

60

| 600 | 602 | 604 | 606 |
|---|---|---|---|
| Image obtaining unit | Candidate pixel determining unit | Location obtaining unit | Extension unit |

Lane line detection apparatus

LANE LINE DETECTION METHOD, RELATED DEVICE, AND COMPUTER-READABLE STORAGE MEDIUM

CROSS-REFERENCE TO RELATED APPLICATIONS

This application is a continuation of International Application No. PCT/CN2020/114289, filed on Sep. 9, 2020, the disclosure of which is hereby incorporated by reference in its entirety.

TECHNICAL FIELD

This application relates to the field of intelligent transportation technologies, and furthermore, to a lane line detection method, a related device, and a computer-readable storage medium.

BACKGROUND

In recent years, with improvement of living standards and a scientific and technological level, an increasing number of scholars have carried out in-depth researches on intelligent vehicle technologies, for example, an advanced driving assistant system (ADAS) and an autonomous driving system (ADS). A lane line detection technology is crucial to both of them. In an embodiment, lane line detection means detecting a lane line on a road during driving of a vehicle, to ensure that the vehicle is within restrictions of a lane, and reduce chances of collision between the vehicle and another vehicle because the vehicle crosses the lane. Driving scenarios are diverse, lane line types are diverse, interference is caused by a plurality of environmental factors such as a distance, blocking, and light, and so on. In addition, a quantity of lane lines in each frame of image is not fixed. Therefore, lane line detection is still a challenging subject.

In existing research results of lane line detection technologies, usually, an original image is first preprocessed (for example, edge detection is performed) to obtain edge information of the image, and then edge points of a lane line are extracted by using the obtained edge information, and finally, the lane line is obtained through fitting by using the edge points of the lane line. However, in this method, a large amount of computation is required in a process of extracting image edges. This not only consumes computation resources, but is likely to cause inaccuracy of lane line detection. Further, in the foregoing method, although a lane line relatively close to a current location of a vehicle can be detected, a lane line relatively far away from the current location of the vehicle cannot be accurately detected. However, in an application scenario of lane line detection, a lane line needs to be quickly and accurately detected to assist a driver in decision-making, so as to avoid traffic accidents. Therefore, how to quickly and accurately detect a lane line is a technical problem that urgently needs to be resolved.

SUMMARY

This application provides a lane line detection method, a related device, and a computer-readable storage medium, to quickly and accurately detect a lane line.

According to a first aspect, an embodiment of this application provides a lane line detection method. The method may include the following operations: first, obtaining a to-be-recognized lane line image; then determining, based on the lane line image, a candidate pixel used to recognize a lane line region, to obtain a candidate point set, where the lane line region is a region of a location of a lane line in the lane line image and a surrounding region of the location of the lane line, and the candidate pixel is a pixel that is very likely to fall within the lane line region; selecting a target pixel from the candidate point set, and obtaining at least three location points associated with the target pixel in a neighborhood, where the at least three location points are on one lane line, and herein, a location of the target pixel indicates that a lane line exists, and three location points are used to represent a partial structure of a lane line in the neighborhood of the target pixel; and performing extension by using the target pixel as a start point and based on the at least three location points associated with the target pixel, to obtain a lane line point set corresponding to the target pixel.

In an embodiment of the application, a lane line detection device may obtain, by using the target pixel as a start point and based on the at least three locations associated with the target pixel, other instance points of the lane line that are obtained by extending the target pixel, and then obtain the lane line point set. In an embodiment, the lane line in the lane line image can be quickly and accurately recognized. Further, in the method, a lane line relatively close to a current location of a vehicle can be quickly and accurately detected, and a lane line currently relatively far away from a lane can also be quickly and accurately detected, that is, extensibility of a lane line can be well reflected. This provides a basis for self-driving, and can further ensure safety during self-driving.

In an embodiment, an implementation process of the determining, based on the lane line image, a candidate pixel used to recognize a lane line region, to obtain a candidate point set may include: first, generating a confidence map of the lane line image, where the confidence map includes a confidence value of each pixel in the lane line image, and the confidence value indicates a confidence of each pixel in the lane line image belonging to the lane line region; and then determining, in the confidence map, the candidate pixel used to recognize the lane line region.

In an embodiment, the at least three location points include a first location point, a second location point, and a third location point, N rows above a pixel row in which the target pixel is located are pixel rows in which the first location point is located, the pixel row in which the target pixel is located is the same as that in which the second location point is located, M rows under the pixel row in which the target pixel is located are pixel rows in which the third location point is located, and M and N are integers greater than 0. An implementation process of the performing extension by using the target pixel as a start point and based on the at least three location points associated with the target pixel may include: first, adjusting a start location of the target pixel based on a first offset, to obtain a final location of the target pixel, where the first offset is an offset from the target pixel to the second location point; obtaining, by using the final location of the target pixel as a start point, a first lane line point that is obtained by performing extension on the target pixel based on a second offset, and obtaining a second lane line point that is obtained by performing extension on the target pixel based on a third offset, where the second offset is an offset from the target pixel to the first location point, and the third offset is an offset from the target pixel to the third location point; when a confidence value corresponding to the first lane line point is greater than a first confidence value, performing, by using the first lane line point as a current target pixel, an operation of obtaining a first lane line point that is obtained by performing extension on the target pixel based on the first offset and the second offset, until a confidence value corresponding to a first lane line point obtained through extension is not greater than the first confidence value; and when a confidence value corresponding to the second lane line point is greater than the first confidence value, performing, by using the second lane line point as a current target pixel, an operation of obtaining a second lane line point that is obtained by performing extension on the target pixel based on the first offset and the third offset, until a confidence value corresponding to a second lane line point obtained through extension is not greater than the first confidence value. In an embodiment of the application, it can be ensured that all lane line points obtained through extension are pixels belonging to the lane line region, thereby avoiding extension based on an invalid lane line point, so that a lane line can be quickly and accurately recognized.

In an embodiment, the at least three location points include a fourth location point and a fifth location point, N rows above a pixel row in which the target pixel is located are pixel rows in which the fourth location point is located, M rows under the pixel row in which the target pixel is located are pixel rows in which the fifth location point is located, and M and N are integers greater than 0. An implementation process of the performing extension by using the target pixel as a start point and based on the at least three location points associated with the target pixel may include: first, obtaining, by using a start location of the target pixel as a start point, a third lane line point that is obtained by performing extension on the target pixel based on a fourth offset, and obtaining a fourth lane line point that is obtained by performing extension on the target pixel based on a fifth offset, where the fourth offset is an offset from the target pixel to the fourth location point, and the fifth offset is an offset from the target pixel to the fifth location point; then, when a confidence value corresponding to the third lane line point is greater than a first confidence value, performing, by using the third lane line point as a current target pixel, an operation of obtaining a third lane line point that is obtained by performing extension on the target pixel based on the fourth offset, until a confidence value corresponding to a third lane line point obtained through extension is not greater than the first confidence value; and when a confidence value corresponding to the fourth lane line point is greater than the first confidence value, performing, by using the fourth lane line point as a current target pixel, an operation of obtaining a fourth lane line point that is obtained by performing extension on the target pixel based on the fifth offset, until a confidence value corresponding to a fourth lane line point obtained through extension is not greater than the first confidence value. In an embodiment of the application, it can be ensured that all lane line points obtained through extension are pixels belonging to the lane line region, thereby avoiding extension based on an invalid lane line point, so that a lane line can be quickly and accurately recognized.

In an embodiment, the three location points include a sixth location point, a seventh location point, and an eighth location point, N (for example, N=1) rows above a pixel row in which the target pixel is located are pixel rows in which the sixth location point is located, the pixel row in which the target pixel is located is the same as that in which the seventh location point is located, and M (for example, M=1) rows under the pixel row in which the target pixel is located are pixel rows in which the eighth location point is located. An implementation process of the performing extension by using the target pixel as a start point and based on the at least three location points associated with the target pixel may include: adjusting a start location of the target pixel by using the target pixel as a start point and based on a sixth offset, to obtain a sixth lane line point, where the sixth offset is an offset from the target pixel to the second location point; obtaining a candidate pixel closest to the sixth location point based on a seventh offset, to obtain a seventh lane line point, and obtaining an eighth lane line point that is obtained by performing extension on the seventh lane line point based on the sixth offset; and obtaining a candidate pixel closest to the eighth location point based on an eighth offset, to obtain a ninth lane line point, and obtaining a tenth lane line point that is obtained by performing extension on the ninth lane line point based on the sixth offset, where the sixth lane line point, the eighth lane line point, and the tenth lane line point are used to constitute the lane line point set corresponding to the target pixel.

In an embodiment, the three location points include a ninth location point and a tenth location point, N (for example, N=1) rows above a pixel row in which the target pixel is located are pixel rows in which the ninth location point is located, and M (for example, M=1) rows under the pixel row in which the target pixel is located are pixel rows in which the tenth location point is located. An implementation process of the performing extension by using the target pixel as a start point and based on the at least three location points associated with the target pixel may include: obtaining a candidate pixel closest to the ninth location point by using the target pixel as a start point and based on a ninth offset, to obtain an eleventh lane line point; and obtaining a candidate pixel closest to the tenth location point based on a tenth offset, to obtain a twelfth lane line point, where the eleventh lane line point and the twelfth lane line point are used to constitute the lane line point set corresponding to the target pixel.

In an embodiment, an implementation process of the selecting a target pixel from the candidate point set may include: first, selecting a target pixel row from the lane line image based on the confidence map, where the target pixel row is a pixel row that has a largest quantity of target confidence maximums in a neighborhood in which a first pixel is located, the first pixel is a pixel whose confidence value is greater than a second confidence threshold, the target confidence maximum is greater than the second confidence threshold, the confidence map includes the confidence value of each pixel in the lane line image, and the confidence value indicates the confidence of each pixel in the lane line image belonging to the lane line region; and then selecting, from the target pixel row as the target pixel, all pixels whose confidence values are greater than the second confidence value, or selecting, as the target pixel, a pixel whose confidence value is greater than the second confidence value and that corresponds to a confidence maximum in a neighborhood. In an embodiment of the application, it can be ensured that a plurality of determined target pixels cover all lane lines included in the lane line image as far as possible, to avoid missed detection.

In an embodiment, an implementation process of the selecting a target pixel from the candidate point set may include: first, selecting a target pixel row from the lane line image based on the confidence map, where the target pixel row is a plurality of pixel rows in which a quantity of second pixels is greater than a target value, the second pixel is a pixel whose confidence value is greater than a second confidence threshold, the confidence map includes the confidence value of each pixel in the lane line image, and the confidence value indicates the confidence of each pixel in the lane line image belonging to the lane line region; and then selecting, from the target pixel row as the target pixel, all pixels whose confidence values are greater than the second confidence value. In an embodiment of the application, it can be ensured that a plurality of determined target pixels cover all lane lines included in the lane line image as far as possible, to avoid missed detection.

In an embodiment, when the target pixel comes from a plurality of pixel rows, the method described in this application may further include the following operations: first, obtaining an intersection over union between every two lane line point sets; and then determining whether the intersection over union between every two lane line point sets is greater than a target threshold, and if the intersection over union between every two lane line point sets is greater than the target threshold, deleting either of the every two lane line point sets. In an embodiment of the application, when determining that the intersection over union between every two lane line point sets is greater than the target threshold, the lane line detection device deletes either of the every two lane line point sets, so that accuracy of a lane line recognition result can be ensured, and false detection is avoided.

According to a second aspect, an embodiment of this application provides a lane line detection apparatus. The apparatus may include: an image obtaining unit, configured to obtain a to-be-recognized lane line image; a candidate pixel determining unit, configured to determine, based on the lane line image, a candidate pixel used to recognize a lane line region, to obtain a candidate point set, where the lane line region is a region including a location of a lane line in the lane line image and a surrounding region of the location of the lane line; a location obtaining unit, configured to select a target pixel from the candidate point set, and obtain at least three location points associated with the target pixel in a neighborhood, where the at least three location points are on one lane line; and an extension unit, configured to perform extension by using the target pixel as a start point and based on the at least three location points associated with the target pixel, to obtain a lane line point set corresponding to the target pixel.

In an embodiment of the application, a lane line detection device may obtain, by using the target pixel as a start point and based on the at least three locations associated with the target pixel, other instance points of the lane line that are obtained by extending the target pixel, and then obtain the lane line point set. In this implementation, the lane line in the lane line image can be quickly and accurately recognized.

In an embodiment, the candidate pixel determining unit is configured to: generate a confidence map of the lane line image, where the confidence map includes a confidence value of each pixel in the lane line image, and the confidence value indicates a confidence of each pixel in the lane line image belonging to the lane line region; and determine, in the confidence map, the candidate pixel used to recognize the lane line region.

In an embodiment, the at least three location points include a first location point, a second location point, and a third location point, N rows above a pixel row in which the target pixel is located are pixel rows in which the first location point is located, the pixel row in which the target pixel is located is the same as that in which the second location point is located, M rows under the pixel row in which the target pixel is located are pixel rows in which the third location point is located, and M and N are integers greater than 0. The extension unit is configured to: adjust a start location of the target pixel based on a first offset, to obtain a final location of the target pixel, where the first offset is an offset from the target pixel to the second location point; obtain, by using the final location of the target pixel as a start point, a first lane line point that is obtained by performing extension on the target pixel based on a second offset, and obtain a second lane line point that is obtained by performing extension on the target pixel based on a third offset, where the second offset is an offset from the target pixel to the first location point, and the third offset is an offset from the target pixel to the third location point; when a confidence value corresponding to the first lane line point is greater than a first confidence value, perform, by using the first lane line point as a current target pixel, an operation of obtaining a first lane line point that is obtained by performing extension on the target pixel based on the first offset and the second offset, until a confidence value corresponding to a first lane line point obtained through extension is not greater than the first confidence value; and when a confidence value corresponding to the second lane line point is greater than the first confidence value, perform, by using the second lane line point as a current target pixel, an operation of obtaining a second lane line point that is obtained by performing extension on the target pixel based on the first offset and the third offset, until a confidence value corresponding to a second lane line point obtained through extension is not greater than the first confidence value.

In an embodiment, the at least three location points include a fourth location point and a fifth location point, N rows above a pixel row in which the target pixel is located are pixel rows in which the fourth location point is located, M rows under the pixel row in which the target pixel is located are pixel rows in which the fifth location point is located, and M and N are integers greater than 0. The extension unit is configured to: obtain, by using a start location of the target pixel as a start point, a third lane line point that is obtained by performing extension on the target pixel based on a fourth offset, and obtain a fourth lane line point that is obtained by performing extension on the target pixel based on a fifth offset, where the fourth offset is an offset from the target pixel to the fourth location point, and the fifth offset is an offset from the target pixel to the fifth location point; when a confidence value corresponding to the third lane line point is greater than a first confidence value, perform, by using the third lane line point as a current target pixel, an operation of obtaining a third lane line point that is obtained by performing extension on the target pixel based on the fourth offset, until a confidence value corresponding to a third lane line point obtained through extension is not greater than the first confidence value; and when a confidence value corresponding to the fourth lane line point is greater than the first confidence value, perform, by using the fourth lane line point as a current target pixel, an operation of obtaining a fourth lane line point that is obtained by performing extension on the target pixel based on the fifth offset, until a confidence value corresponding to a fourth lane line point obtained through extension is not greater than the first confidence value.

In an embodiment, the at least three location points include a sixth location point, a seventh location point, and an eighth location point, N rows above a pixel row in which the target pixel is located are pixel rows in which the sixth location point is located, the pixel row in which the target pixel is located is the same as that in which the seventh location point is located, M rows under the pixel row in which the target pixel is located are pixel rows in which the eighth location point is located, and M and N are integers greater than 0. The extension unit is configured to: adjust a start location of the target pixel by using the target pixel as a start point and based on a sixth offset, to obtain a sixth lane line point, where the sixth offset is an offset from the target pixel to the seventh location point; obtain a candidate pixel closest to the sixth location point based on a seventh offset, to obtain a seventh lane line point, and obtain an eighth lane line point that is obtained by performing extension on the seventh lane line point based on the sixth offset; and obtain a candidate pixel closest to the eighth location point based on an eighth offset, to obtain a ninth lane line point, and obtain a tenth lane line point that is obtained by performing extension on the ninth lane line point based on the sixth offset, where the sixth lane line point, the eighth lane line point, and the tenth lane line point are used to constitute the lane line point set corresponding to the target pixel.

In an embodiment, the location obtaining unit includes a pixel selection unit. The pixel selection unit is configured to: select a target pixel row from the lane line image based on the confidence map, where the target pixel row is a pixel row that has a largest quantity of target confidence maximums in a neighborhood in which a first pixel is located, the first pixel is a pixel whose confidence value is greater than a second confidence threshold, the target confidence maximum is greater than the second confidence threshold, the confidence map includes the confidence value of each pixel in the lane line image, and the confidence value indicates the confidence of each pixel in the lane line image belonging to the lane line region; and select, from the target pixel row as the target pixel, all pixels whose confidence values are greater than the second confidence value, or select, as the target pixel, a pixel whose confidence value is greater than the second confidence value and that corresponds to a confidence maximum in a neighborhood.

In an embodiment, the location obtaining unit includes a pixel selection unit. The pixel selection unit is configured to: select a target pixel row from the lane line image based on the confidence map, where the target pixel row is a plurality of pixel rows in which a quantity of second pixels is greater than a target value, the second pixel is a pixel whose confidence value is greater than a second confidence threshold, the confidence map includes the confidence value of each pixel in the lane line image, and the confidence value indicates the confidence of each pixel in the lane line image belonging to the lane line region; and select, from the target pixel row as the target pixel, all pixels whose confidence values are greater than the second confidence value.

In an embodiment, when the target pixel comes from a plurality of pixel rows, the apparatus further includes a deduplication unit, configured to: obtain an intersection over union between every two lane line point sets; and if the intersection over union between every two lane line point sets is greater than a target threshold, delete either of the every two lane line point sets.

According to a third aspect, an embodiment of this application further provides a self-driving apparatus, including the apparatus according to any one of the implementations of the second aspect.

According to a fourth aspect, an embodiment of this application provides a lane line detection device. The lane line detection device may include a memory and a processor. The memory is configured to store a computer program that supports the device in performing the foregoing method. The computer program includes program instructions. The processor is configured to invoke the program instructions to perform the method according to any one of the implementations of the first aspect.

According to a fifth aspect, an embodiment of this application provides a chip. The chip includes a processor and a data interface. The processor reads, through the data interface, instructions stored in a memory, to perform the method in the first aspect.

In an embodiment, the chip may further include a memory, the memory stores instructions, the processor is configured to execute the instructions stored in the memory; and when the instructions are executed, the processor is configured to perform a part or all of the method in the first aspect.

According to a sixth aspect, an embodiment of this application further provides a computer-readable storage medium. The computer-readable storage medium stores a computer program, and the computer program includes program instructions. When the program instructions are executed by a processor, the processor is enabled to perform the method according to any one of the implementations of the first aspect.

According to a seventh aspect, an embodiment of this application further provides a computer program. The computer program includes computer software instructions. When the computer software instructions are executed by a computer, the computer is enabled to perform any lane line detection method according to the first aspect.

DESCRIPTION OF EMBODIMENTS

Figure 1A:
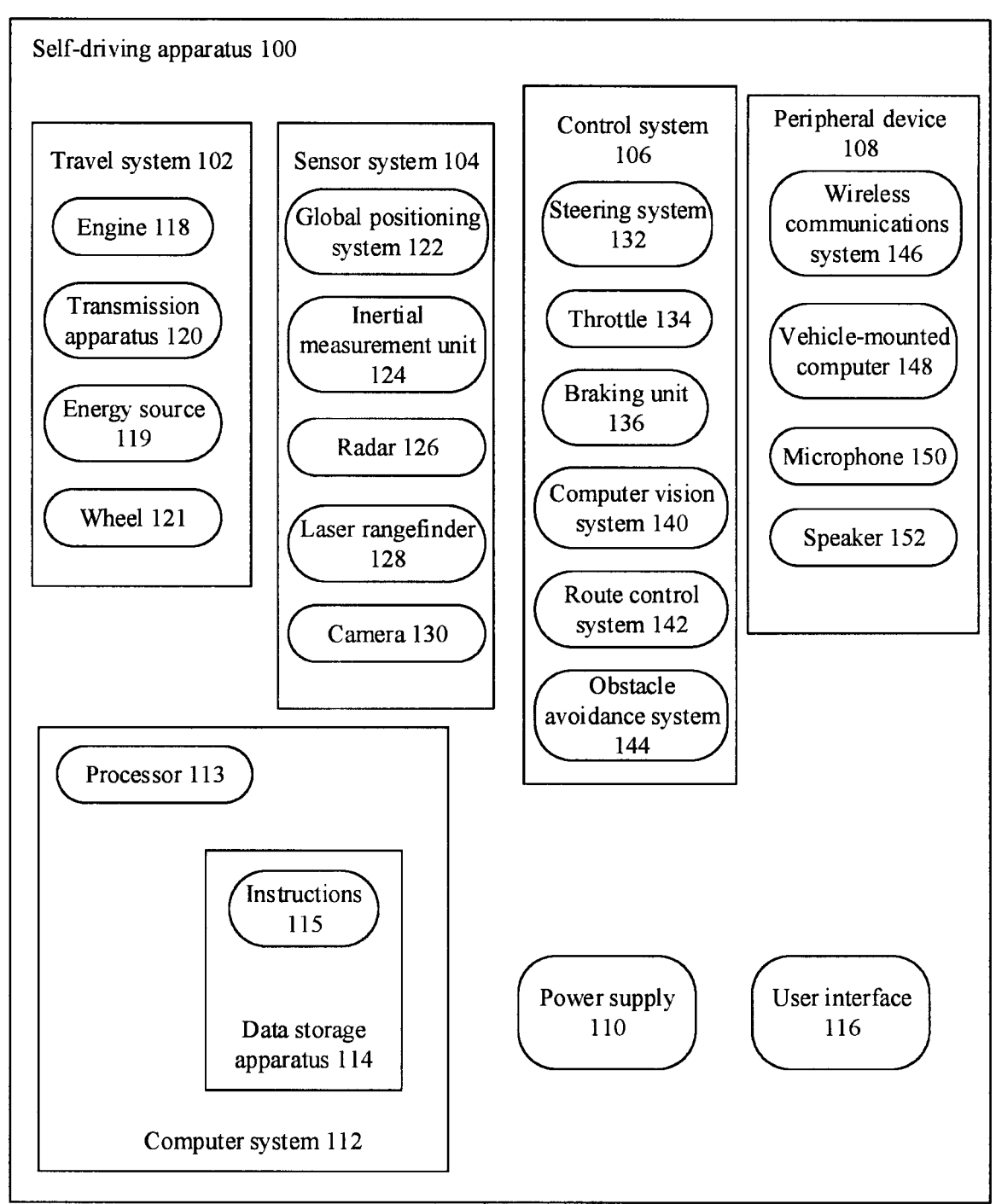
FIG. 1a is a schematic diagram of a structure of a self-driving apparatus 100 according to an embodiment of this application.

The following describes embodiments of this application with reference to the accompanying drawings in embodiments of this application.

In the specification and accompanying drawings of this application, the terms "first", "second", and the like are intended to distinguish between different objects or distinguish between different processing of a same object, but are not used to describe a particular order of the objects. In addition, the terms "include", "contain", and any other variants thereof mentioned in descriptions of this application are intended to cover a non-exclusive inclusion. For example, a process, a method, a system, a product, or a device that includes a series of operations or units is not limited to the listed operations or units, but optionally includes other unlisted operations or units, or optionally includes other inherent operations or units of the process, the method, the product, or the device. It should be noted that in embodiments of this application, the word "an example", "for example", or the like is used to represent giving an example, an illustration, or a description. Any embodiment or design scheme described as "example" or "for example"

in embodiments of this application should not be explained as being more preferred or having more advantages than another embodiment or design scheme. Exactly, use of the word "example" or "for example" or the like is intended to present a relative concept in a manner. In embodiments of this application, "A and/or B" represents two meanings: A and B, and A or B. "A, and/or B, and/or C" represents any one of A, B, and C, or represents any two of A, B, and C, or represents A, B, and C.

For ease of better understanding the technical solutions described in this application, the following first explains technical terms used in embodiments of this application.

(1) Self-Driving Vehicle (Autonomous Vehicles, Self-Piloting Automobile)

In embodiments of this application, the self-driving vehicle is also referred to as a driverless automobile, a computer-driven automobile, or a wheeled mobile robot, and is an intelligent automobile that implements self-driving by using a computer system. In actual application, the self-driving vehicle relies on cooperation of artificial intelligence, visual computing, a radar, a monitoring apparatus, and a global positioning system, so that a computer device can automatically and safely operate a motor vehicle without any proactive human operations.

(2) Lane Line

In embodiments of this application, the lane line is a lane marker used to guide driving of a vehicle.

In actual application, the lane line is usually colored. For example, a color of the lane line may be a white color or a yellow color. This is not specifically limited in embodiments of this application. In an embodiment, the lane line may be represented by a white solid line, a white dashed line, a yellow solid line, a yellow dashed line, a lane stop line, or the like. The yellow color is used to distinguish between lanes in different directions. A single yellow line is usually used on a road with four or fewer two-way lanes (including a bicycle lane). Double yellow lines are usually used on a relatively wide pavement. When the double yellow lines are represented by one solid line and one dashed line, a vehicle on the yellow dashed line side may temporarily travel across lanes, for example, during turning or overtaking, while ensuring safety; and a vehicle on the yellow solid line side is prohibited from performing overtaking, crossing a lane, or making a U-turn. When the double yellow lines are represented by two solid lines, it indicates that cross-lane driving is prohibited. For another example, a white line is used to distinguish between different lanes in one direction.

In embodiments of this application, a road refers to a passage on which a vehicle travels and that is used to connect two places. The lane is a passageway for one column of vehicles that drive along a same direction. A commonly-seen lane includes different types such as a straight lane, a left turn lane, and a right turn lane. One road includes one or more lanes. For example, one road includes four lanes: one left turn lane, two straight lanes, and one right turn lane. For example, using a single straight lane as an example, the single straight lane includes two lane lines.

It should be noted that a lane line detection method provided in this application may be applied to driving assistance (for example, lane keeping assistance and lane departure correction in advanced driving assistance, and intelligent cruise assistance in the advanced driving assistance) and vehicle positioning scenarios, and may be further applied to an entire self-driving process of a vehicle, to ensure safety and smoothness of the vehicle in the driving process.

FIG. 1a is a functional block diagram of a self-driving apparatus 100 according to an embodiment of this application. In some implementations, the self-driving apparatus 100 may be configured to be in a full self-driving mode, a partial self-driving mode, or a manual driving mode. Self-driving levels proposed by the Society of Automotive Engineers (SAE) are used as examples. The full self-driving mode may be L5, which indicates that a vehicle performs all driving operations, and a human driver does not need to keep attention. The partial self-driving mode may be L1, L2, L3, or L4. L1 indicates that a vehicle provides driving for one operation of a steering wheel and acceleration/deceleration, and a human driver is responsible for a remaining driving operation. L2 indicates that a vehicle provides driving for a plurality of operations of a steering wheel and acceleration/deceleration, and a human driver is responsible for a remaining driving action. L3 indicates that a vehicle performs most driving operations, and a human driver needs to stay focused in case of unexpected needs. L4 indicates that a vehicle performs all driving operations, and a human driver does not need to keep attention, but road and environmental conditions are limited. The manual driving mode may be L0, which indicates that a human driver fully drives an automobile.

In an actual application, the self-driving apparatus 100 may control the self-driving apparatus 100 in the self-driving mode, determine a status of the self-driving apparatus 100 and a status of an ambient environment of the self-driving apparatus 100 through a manual operation, determine possible behavior of at least one another vehicle in the ambient environment, determine a confidence level corresponding to a possibility of performing the possible behavior by the another vehicle, and control the self-driving apparatus 100 based on determined information. When the self-driving apparatus 100 is in the full self-driving mode, it may be set that the self-driving apparatus 100 may operate in a case of not interacting with a person.

In an embodiment of the application, the self-driving apparatus 100 may include a plurality of subsystems, for example, a travel system 102, a sensor system 104, a control system 106, one or more peripheral devices 108, a power supply 110, a computer system 112, and a user interface 116. In some implementations, the self-driving apparatus 110 may include more or fewer subsystems, and each subsystem may include a plurality of elements. In addition, the subsystems and the elements of the self-driving apparatus 100 may be all interconnected in a wired or wireless manner.

In an embodiment of the application, the travel system 102 may include a component that provides power for motion of the self-driving apparatus 100. In some implementations, the travel system 102 may include an engine 118, an energy source 119, a transmission apparatus 120, and a wheel/tire 121. The engine 118 may be an internal combustion engine, an electric motor, an air compression engine, or a combination of other types of engines, for example, a hybrid engine including a gasoline engine and an electric motor, or a hybrid engine including an internal combustion engine and an air compression engine. In actual application, the engine 118 converts the energy source 119 into mechanical energy.

In an embodiment of the application, the energy source 119 may include but is not limited to gasoline, diesel, other petroleum-based fuels, propane, other compressed gas-based fuels, anhydrous alcohol, a photovoltaic module, a battery, or other power sources. The energy source 119 may further provide energy for another system of the self-driving apparatus 100.

In an embodiment of the application, the transmission apparatus 120 may transmit mechanical power from the engine 118 to the wheel 121. The transmission apparatus 120 may include a gear box, a differential, and a drive shaft. In an embodiment, the transmission apparatus 120 may further include another component, for example, a clutch. The drive shaft may include one or more shafts that may be coupled to one or more wheels 121.

In an embodiment of the application, the sensor system 104 may include several sensors that sense information about an ambient environment of the self-driving apparatus 100. For example, the sensor system 104 may include a positioning system 122 (where the positioning system may be a GPS system, a BeiDou system, or another positioning system), an inertial measurement unit (IMU) 124, a radar 126, a laser rangefinder 128, and a camera 130. The sensor system 104 may further include a sensor that monitors an internal system of the self-driving apparatus 100 for example, an in-vehicle air quality monitor, a fuel gauge, or an oil temperature gauge. Sensor data from one or more of these sensors may be used to detect objects and corresponding features (for example, a location, a shape, a direction, and a speed) of the objects. Detection and recognition are key functions for implementing a secure operation by the self-driving apparatus 100.

In an embodiment of the application, the global positioning system 122 may be configured to estimate a geographical location of the self-driving apparatus 100. For example, the geographical location of the self-driving apparatus 100 may be estimated by the IMU 124. In an embodiment, the IMU 124 is configured to sense a location and direction change of the self-driving apparatus 100 based on an inertial acceleration. In some implementations, the IMU 124 may be a combination of an accelerometer and a gyroscope.

In an embodiment of the application, the radar 126 may use a radio signal to sense an object in an ambient environment of the self-driving apparatus 100. In some implementations, in addition to sensing an object, the radar 126 may also be configured to sense a speed and/or an advancing direction of the object.

In an embodiment of the application, the laser rangefinder 128 may use laser light to sense an object in an environment in which the self-driving apparatus 100 is located. In some embodiments, the laser rangefinder 128 may include one or more laser sources, a laser scanner, one or more detectors, and another system component.

In an embodiment of the application, the camera 130 may be configured to capture a plurality of images of the ambient environment of the self-driving apparatus 100. In some implementations, the camera 130 may be a still camera or a video camera. This is not specifically limited in an embodiment of the application.

In an embodiment of the application, the control system 106 may control operations of the self-driving apparatus 100 and the components. The control system 106 may include various elements, including a steering system 132, a throttle 134, a braking unit 136, a computer vision system 140, a route control system 142, and an obstacle avoidance system.

In an embodiment of the application, the steering system 132 may be operated to adjust an advancing direction of the self-driving apparatus 100. For example, in an embodiment, the steering system may be a steering wheel system.

In an embodiment of the application, the throttle 134 is configured to control an operating speed of the engine 118, so as to control a speed of the self-driving apparatus 100.

In an embodiment of the application, the braking unit 136 is configured to control the speed of the self-driving apparatus 100. The braking unit 136 may use friction to slow down the rotation of the wheel 121. In some implementations, the braking unit 136 may convert kinetic energy of the wheel 121 into a current. The braking unit 136 may alternatively use another form to reduce a rotational speed of the wheel 121, so as to control the speed of the self-driving apparatus 100.

In an embodiment of the application, the computer vision system 140 may operate to process and analyze an image captured by the camera 130, so as to recognize objects and/or features in the ambient environment of the self-driving apparatus 100. In some implementations, the objects and/or the features mentioned herein may include but are not limited to a traffic signal, a road boundary, and an obstacle. The computer vision system 140 may use an object recognition algorithm, a structure from motion (SFM) algorithm, visual tracking, and other computer vision technologies. In some implementations, the computer vision system 140 may be configured to draw a map for an environment, track an object, estimate a speed of an object, and the like.

In an embodiment of the application, the route control system 142 is configured to determine a driving route of the self-driving apparatus 100. In some implementations, the route control system 142 may determine the driving route for the self-driving apparatus 100 with reference to data from the sensor, the positioning system 122, and one or more predetermined maps.

In an embodiment of the application, the obstacle avoidance system 144 is configured to recognize, evaluate, and avoid or bypass, in another manner, a potential obstacle in the environment of the self-driving apparatus 100. As the name suggests, the obstacle is an object that performs an obstruction or hindering function. For example, the potential obstacle may include an obstacle that has potential or direct impact on driving of the vehicle, for example, a vehicle other than the vehicle, a pedestrian, a bicycle, or a static object.

It can be understood that, in some implementations, the control system 106 may additionally or alternatively include components other than those shown and described in FIG. 1*a*. Alternatively, the control system 106 may delete some of the components.

In an embodiment of the application, the self-driving apparatus 100 interacts with an external sensor, another vehicle, another computer system, or a user by using the peripheral device 108. The peripheral device 108 may include a wireless communications system 146, a vehicle-mounted computer 148, a microphone 150, and/or a speaker 152.

In some implementations, the peripheral device 108 provides a means for a user of the self-driving apparatus 100 to interact with the user interface 116. For example, the vehicle-mounted computer 148 may provide information for the user of the self-driving apparatus 100. The user interface 116 may further operate the vehicle-mounted computer 148 to receive a user input. The vehicle-mounted computer 148 may be operated by using a touchscreen. In other cases, the peripheral device 108 may provide a means used by the self-driving apparatus 100 to communicate with another device in a vehicle. For example, the microphone 150 may receive audio, for example, a voice command or another audio input, from the user of the self-driving apparatus 100. Likewise, the speaker 150 may output audio to the user of the self-driving apparatus 100.

In an embodiment of the application, the wireless communications system 146 may wirelessly communicate with one or more devices directly or by using a communications network. For example, the wireless communications system

146 may use 3G cellular communication such as CDMA, EVD0, GSM/GPRS, or 4G cellular communication such as LTE. Alternatively, the wireless communications system may use 5G cellular communication. In some implementations, the wireless communications system 146 may communicate with a wireless local area network (WLAN) by using Wi-Fi. In some implementations, the wireless communications system 146 may communicate directly with a device by using an infrared link, Bluetooth, or ZigBee. Other wireless protocols, such as various vehicle communications systems, for example, the wireless communications system 146 may include one or more dedicated short range communications (DSRC) devices, which may include public and/or private data communication between vehicles and/or roadside stations.

In an embodiment of the application, the power supply 110 may supply power to various components of the self-driving apparatus 100. In some implementations, the power supply 110 may be a rechargeable lithium-ion or lead-acid battery. One or more battery packs of such a battery may be configured as a power supply to supply power to the components of the self-driving apparatus 100. In some implementations, the power supply 110 and the energy source 119 may be implemented together. For example, the power supply 110 and the energy source 119 are configured together in some all-electric vehicles.

In an embodiment of the application, some or all functions of the self-driving apparatus 100 are controlled by the computer system 112. The computer system 112 may include at least one processor 113 that executes instructions 115 stored in a non-transitory computer-readable medium such as a data storage apparatus 114. The computer system 112 may alternatively be a plurality of computing devices that control individual components or subsystems of the self-driving apparatus 100 in a distributed manner.

It some implementations, the processor 113 may be any conventional processor, for example, a commercially available central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. Although FIG. 1*a* functionally shows the processor, the memory, and other elements in a same physical housing, one of ordinary skilled in the art should understand that the processor, the computer system, or the memory alternatively includes a plurality of processors, computer systems, or memories that may not be stored in a same physical housing. For example, the memory may be a hard disk drive or another storage medium located in a housing different from the physical housing. Therefore, references to the processor or the computer system will be understood as including references to a set of processors or computer systems or memories that can be operated in parallel, or references to a set of processors or computer systems or memories that may not be operated in parallel. Different from using a single processor to perform the operations described herein, some components, such as a steering component and a deceleration component, may each have its own processor that performs only calculation related to component-specific functions.

In various aspects described herein, the processor 113 may be located far away from the vehicle and perform wireless communication with the vehicle. In another aspect, some of processes described herein are performed on a processor arranged in the vehicle, while others are performed by a remote processor, including taking a necessary operation to perform a single operation.

In some implementations, the data storage apparatus 114 may include instructions 115 (for example, program logic), and the instructions 115 may be executed by the processor 113 to perform various functions of the self-driving apparatus 100, including those functions described above. The data storage apparatus 114 may also include additional instructions, including instructions to send data to, receive data from, interact with, and/or control one or more of the travel system 102, the sensor system 104, the control system 106, and the peripheral device 108.

In addition to the instructions 115, the data storage apparatus 114 may store data, for example, a road map, a route message; a location, a direction, a speed, and other vehicle data of a vehicle, and other information. Such information may be used by the self-driving apparatus 100 and the computer system 112 when the self-driving apparatus 100 operates in an autonomous mode, a semi-autonomous mode, and/or a manual mode.

For example, the data storage apparatus 114 obtains environmental information of the vehicle from the sensor 104 or another component of the self-driving apparatus 100. For example, the environmental information may be the following information in an environment in which the vehicle is currently located: lane line information, a quantity of lanes, road boundary information, a road driving parameter, a traffic signal, greenbelt information, and whether there is a pedestrian or a vehicle. The data storage apparatus 114 may further store status information of the vehicle and status information of another vehicle that interacts with the vehicle. The status information may include but is not limited to a speed, acceleration, a heading angle, and the like of the vehicle. For example, the vehicle obtains a distance between the another vehicle and the vehicle, a speed of the another vehicle, and the like based on a speed measurement function and a distance measurement function of the radar 126. In this case, the processor 113 may obtain the vehicle data from the data storage apparatus 114, and determine, based on the information about the environment in which the vehicle is located, a driving policy that meets a safety requirement.

For example, the data storage apparatus 114 may obtain, from the sensor 104 or another component of the self-driving apparatus 100, a driving video recorded during driving of the vehicle, and then preprocess the driving video to obtain a to-be-recognized lane line image. In this case, the processor 113 may obtain the to-be-recognized lane line image from the data storage apparatus 114; determine, based on the lane line image, a candidate pixel used to recognize a lane line region, to obtain a candidate point set; and then select a target pixel from the candidate point set, and obtain at least three location points associated with the target pixel in a neighborhood, where the at least three location points are on one lane line, so that extension may be performed by using the target pixel as a start point and based on the at least three location points associated with the target pixel, to obtain a lane line point set corresponding to the target pixel. To sum up, the foregoing implementation can provide strong support for self-driving of the vehicle.

In an embodiment of the application, the user interface 116 is configured to provide information for or receive information from the user of the self-driving apparatus 100. In some implementations, the user interface 116 may include one or more input/output devices in a set of peripheral devices 108, for example, one or more of the wireless communications system 146, the vehicle-mounted computer 148, the microphone 150, and the speaker 152.

In an embodiment of the application, the computer system 112 may control a function of the self-driving apparatus 100 based on input received from various subsystems (for example, the travel system 102, the sensor system 104, and the control system) and the user interface 116. For example, the computer system 112 may control, by using an input from the control system 106, the steering system 132 to avoid obstacles detected by the sensor system 104 and the obstacle avoidance system 144. In some implementations, the computer system 112 is operable to provide control over many aspects of the self-driving apparatus 100 and the subsystems of the self-driving apparatus 100.

In some implementations, one or more of the foregoing components may be mounted in separation from or associated with the self-driving apparatus 100. For example, the data storage apparatus 114 may be partially or completely separated from the self-driving apparatus 100. The components may be communicatively coupled together in a wired and/or wireless manner.

In some implementations, the foregoing components are merely examples. In actual application, components in the foregoing modules may be added or omitted according to an actual requirement. FIG. 1*a* should not be understood as a limitation on embodiments of this application.

A self-driving vehicle traveling on a road, for example, the self-driving apparatus 100, may recognize an object in an ambient environment of the vehicle, to determine whether to adjust a current driving speed of the self-driving apparatus 100. Herein, the object may be another vehicle, a traffic control device, or another type of object. In some implementations, each recognized object may be independently considered, and a speed to which the self-driving vehicle needs to be adjusted is determined based on a characteristic of the object, for example, current driving data or an acceleration of the object, or a distance between the object and the vehicle.

In some implementations, the self-driving apparatus 100 or a computer device (for example, the computer system 112, the computer vision system 140, or the data storage apparatus 114 shown in FIG. 1*a*) associated with the self-driving apparatus 100 may predict behavior of a recognized object based on a characteristic of the recognized object and a condition (for example, traffic, rain, or ice on a road) of an ambient environment. In some implementations, all recognized objects depend on behavior of each other. Therefore, all the recognized objects may be alternatively jointly considered to predict behavior of a single recognized object. The self-driving apparatus 100 can adjust the speed of the self-driving apparatus 100 based on the predicted behavior of the recognized object. In other words, the self-driving apparatus 100 can determine, based on the predicted behavior of the object, a stable status to which the vehicle needs to be adjusted (for example, an adjustment operation may include acceleration, deceleration, or stop). In this process, another factor may also be considered to determine the speed of the self-driving apparatus 100, for example, a horizontal position of the self-driving apparatus 100 on a road on which the self-driving apparatus 100 travels, a curvature of the road, and proximity between a static object and a dynamic object.

In addition to providing instructions for adjusting the speed of the self-driving vehicle, the computer device may further provide an instruction for modifying a steering angle of the vehicle 100, so that the self-driving vehicle can follow a given track and/or maintain a safe horizontal distance and a safe vertical distance from an object (for example, a car on a neighboring lane of the road) near the self-driving vehicle.

In an embodiment of the application, the self-driving apparatus 100 may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not specifically limited in an embodiment of the application.

In some implementations, the self-driving apparatus 100 may further include a hardware structure and/or a software module, to implement the foregoing functions in a form of a hardware structure, a software module, or a combination of a hardware structure and a software module. Whether a function in the foregoing functions is performed in a form of a hardware structure, a software module, or a hardware structure and a software module depends on particular applications and design constraints of the technical solutions.

Figure 1B:
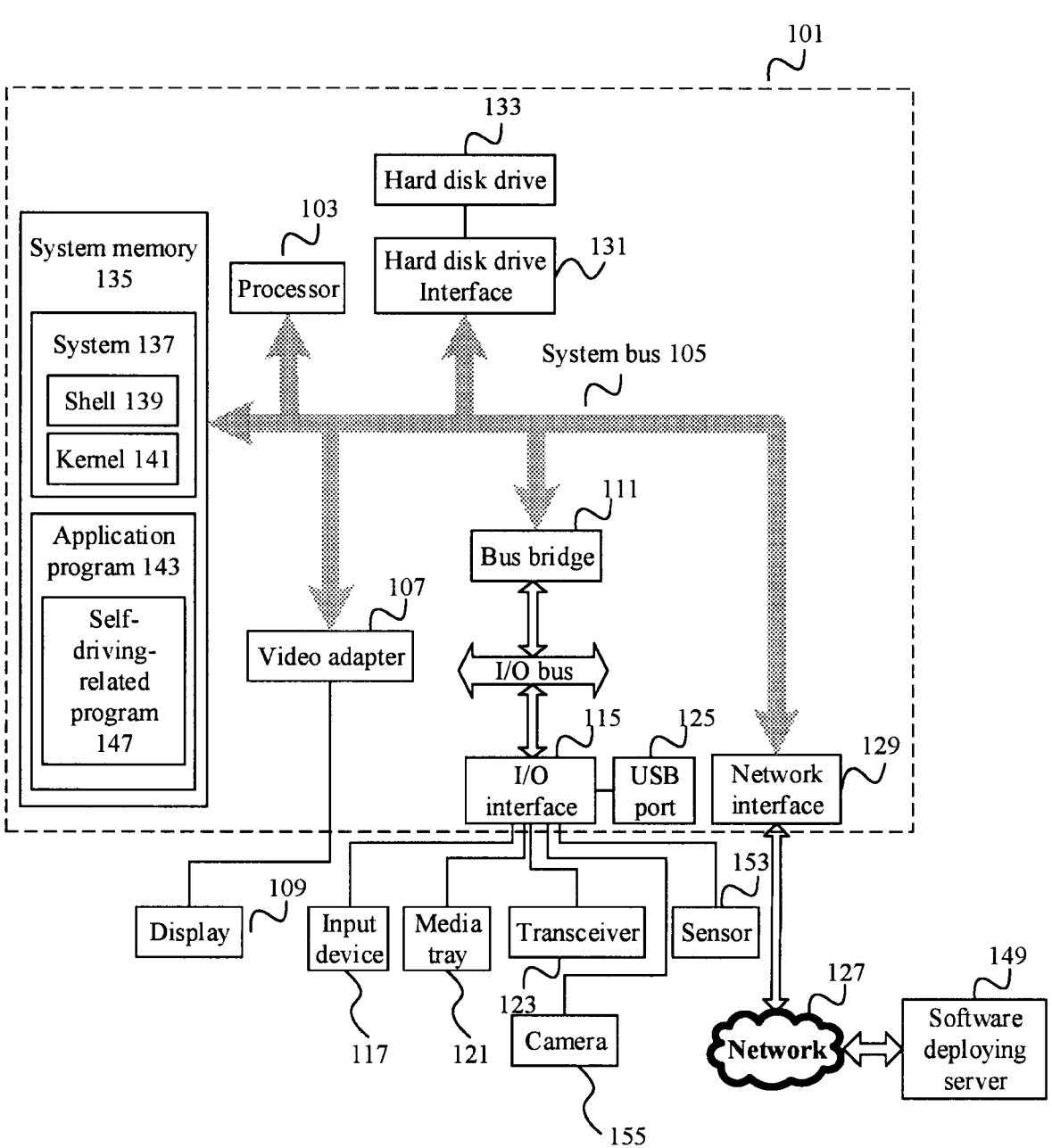
FIG. 1b is a schematic diagram of a structure of a self-driving system according to an embodiment of this application.

FIG. 1a is the functional block diagram of the self-driving apparatus 100. The following describes a self-driving system 101 in the self-driving apparatus 100. FIG. 1b is a schematic diagram of a structure of the self-driving system according to an embodiment of this application. FIG. 1a and FIG. 1b show the self-driving apparatus 100 from different perspectives. For example, the computer system 101 in FIG. 1a is the computer system 112 in FIG. 1b. As shown in FIG. 1b, the computer system 101 includes a processor 103, and the processor 103 is coupled to a system bus 105. The processor 103 may be one or more processors, and each processor may include one or more processor cores. A video adapter 107, where the video adapter may drive a display 109, and the display 109 is coupled to the system bus 105. The system bus 105 is coupled to an input/output (I/O) bus 113 through a bus bridge 111. An I/O interface 115 is coupled to the I/O bus. The I/O interface 115 communicates with a plurality of I/O devices, for example, an input device 117 (for example, a keyboard, a mouse, and a touchscreen) and a media tray 121 (for example, a CD-ROM and a multimedia interface). A transceiver 123 (which may send and/or receive a radio communications signal), a camera 155 (which may capture static and dynamic digital video images), and an external USB interface 125 are provided. In an embodiment, an interface connected to the I/O interface 115 may be a USB interface.

The processor 103 may be any conventional processor, including a reduced instruction set computing ("RISC") processor, a complex instruction set computing ("CISC") processor, or a combination thereof. In an embodiment, the processor may be a dedicated apparatus such as an application-specific integrated circuit ("ASIC"). In an embodiment, the processor 103 may be a neural network processor or a combination of the neural network processor and the foregoing conventional processor.

In an embodiment, the computer system 101 may be located away from a self-driving vehicle, and may communicate wirelessly with a self-driving vehicle 100. In another aspect, some of processes described herein are performed on a processor disposed in the self-driving vehicle, and others are performed by a remote processor, including taking an action required to perform a single manipulation.

The computer 101 may communicate with a software deploying server 149 by using a network interface 129. The network interface 129 is a hardware network interface, such as a network adapter. A network 127 may be an external network, such as the Internet; or may be an internal network, such as the Ethernet or a virtual private network (VPN). In an embodiment, the network 127 may be alternatively a wireless network, for example, a Wi-Fi network or a cellular network.

A hard disk drive interface is coupled to the system bus 105. The hardware drive interface is connected to a hard disk drive. A system memory 135 is coupled to the system bus 105. Data running in the system memory 135 may include an operating system 137 and an application program 143 of the computer 101.

The operating system includes a shell 139 and a kernel (kernel) 141. The shell 139 is an interface between a user and the kernel of the operating system. The shell is an outermost layer of the operating system. The shell manages interaction between the user and the operating system: waiting for input of the user, interpreting the input of the user for the operating system, and processing various output of the operating system.

The kernel 141 includes those parts of the operating system that are used for managing memories, files, peripherals, and system resources. When directly interacting with hardware, the kernel of the operating system usually runs a process, provides inter-process communication, and provides functions such as CPU time slice management, interrupt, memory management, and I/O management.

The application program 141 includes related programs for controlling vehicle's-self driving, for example, a program for managing interaction between the self-driving vehicle and an obstacle on a road, a program for controlling a route or a speed of the self-driving vehicle, or a program for controlling interaction between the self-driving vehicle and another self-driving vehicle on the road. The application program 141 may be on a system of the software deploying server 149. In one embodiment, when the application program 141 needs to be executed, the computer system 101 may download the application program 141 from the deploying server 149.

A sensor 153 is associated with the computer system 101. The sensor 153 is configured to detect an ambient environment of the computer 101. For example, the sensor 153 can detect animals, vehicles, obstacles, pedestrian crosswalks, and the like. Further, the sensor can detect ambient environments of the animals, the vehicles, the obstacles, or the pedestrian crosswalks. For example, the sensor can detect the ambient environment of animals such as other animals in the ambient environment, a weather condition, and brightness of the ambient environment. In an embodiment, if the computer 101 is located on the self-driving car, the sensor may be a camera, an infrared sensor, a chemical detector, a microphone, an inertial measurement unit, a laser rangefinder, a positioning system, or the like. When being activated, the sensor 153 senses information at preset intervals, and provides the sensed information for the computer system 101 in real time or near real time.

For example, the positioning system in the sensor 153 obtains a traveling location of the vehicle, the inertial measurement unit obtains a heading angle of the vehicle, the camera obtains a region in which the vehicle can travel and a size of an obstacle, and the laser rangefinder obtains a distance between the vehicle and the obstacle.

It should be noted that, in an embodiment of the application, the vehicle may also be referred to as an ego vehicle.

The processor 103 obtains, from a hard disk drive based on the system bus 105 and a hard disk drive interface 131, related data collected by the sensor 153 and the camera 155, to invoke the self-driving-related program 147 in the application program 143 to perform the following method:

obtaining a to-be-recognized lane line image; then determining, based on the lane line image, a candidate pixel used to recognize a lane line region, to obtain a candidate point set, where, the lane line region is a region of a location of a lane line in the lane line image and a surrounding region of the location of the lane line; and then selecting a target pixel from the candidate point set, and obtaining at least three location points associated with the target pixel in a neighborhood, where the three location points are on one lane line, and herein, a location of the target pixel indicates that a lane line exists, and three location points are used to represent a partial structure of a lane line in the neighborhood of the target pixel, so that extension may be performed by using the target pixel as a start point and based on the at least three location points associated with the target pixel, to obtain a lane line point set corresponding to the target pixel.

In an embodiment, first, the to-be-recognized lane line image is obtained. Then the to-be-recognized lane line image is input to a trained lane line detection model, to obtain a confidence map and a neighborhood graph by using the trained lane line detection model. The confidence map includes a confidence value of each pixel in the lane line image. The confidence value indicates a confidence of each pixel in the lane line image belonging to the lane line region. For example, a probability that the pixel belongs to the lane line region may be calculated to represent the confidence value. The neighborhood graph includes the at least three location points associated with the target pixel in the neighborhood. Herein, a location of the target pixel indicates that a lane line exists, and three location points are used to represent a partial structure of a lane line in the neighborhood of the target pixel. Then extension is performed by using the target pixel as a start point and based on the at least three location points associated with the target pixel, to obtain a separate lane line point, so as to obtain the lane line point set corresponding to the target pixel. In the foregoing implementation process, a target pixel row may be selected from the lane line image based on the confidence map. In an example, the target pixel row is a pixel row that has a largest quantity of target confidence maximums in a neighborhood in which a first pixel is located, the first pixel is a pixel whose confidence value is greater than a second confidence threshold, and the target confidence maximum is greater than the second confidence threshold. In an example, the target pixel row is a plurality of pixel rows in which a quantity of second pixels is greater than a target value, and the second pixel is a pixel whose confidence value is greater than a second confidence threshold. In this way, the target pixel may be selected from the determined target pixel row. It can be understood that a quantity of target pixels may be represented in a plurality of forms. In an embodiment, in the method, the quantity of target pixels is not preset, and any quantity of lane lines may be detected, to avoid missed detection of a lane line. Therefore, further, the method is applicable to special cases such as lane crossing and convergence.

In an embodiment described in the specification, the computer system 101 may be located far away from the self-driving apparatus 100, and may perform wireless communication with the self-driving apparatus 100. The transceiver 123 may send a self-driving task, the sensor data collected by the sensor 153, and other data to the computer system 101, and may further receive control instructions sent by the computer system 101. The self-driving apparatus may execute the control instruction received by the transceiver 123 from the computer system 101, and perform a corresponding driving operation. In another aspect, some of processes described herein are performed on a processor disposed in the self-driving vehicle, and others are performed by a remote processor, including taking an action required to perform a single operation.

For ease of better understanding this application, the following describes several application scenarios to which the method described in this application may be applied.

First Application Scenario: A Lane Keeping Assistance System

Figure 2A:
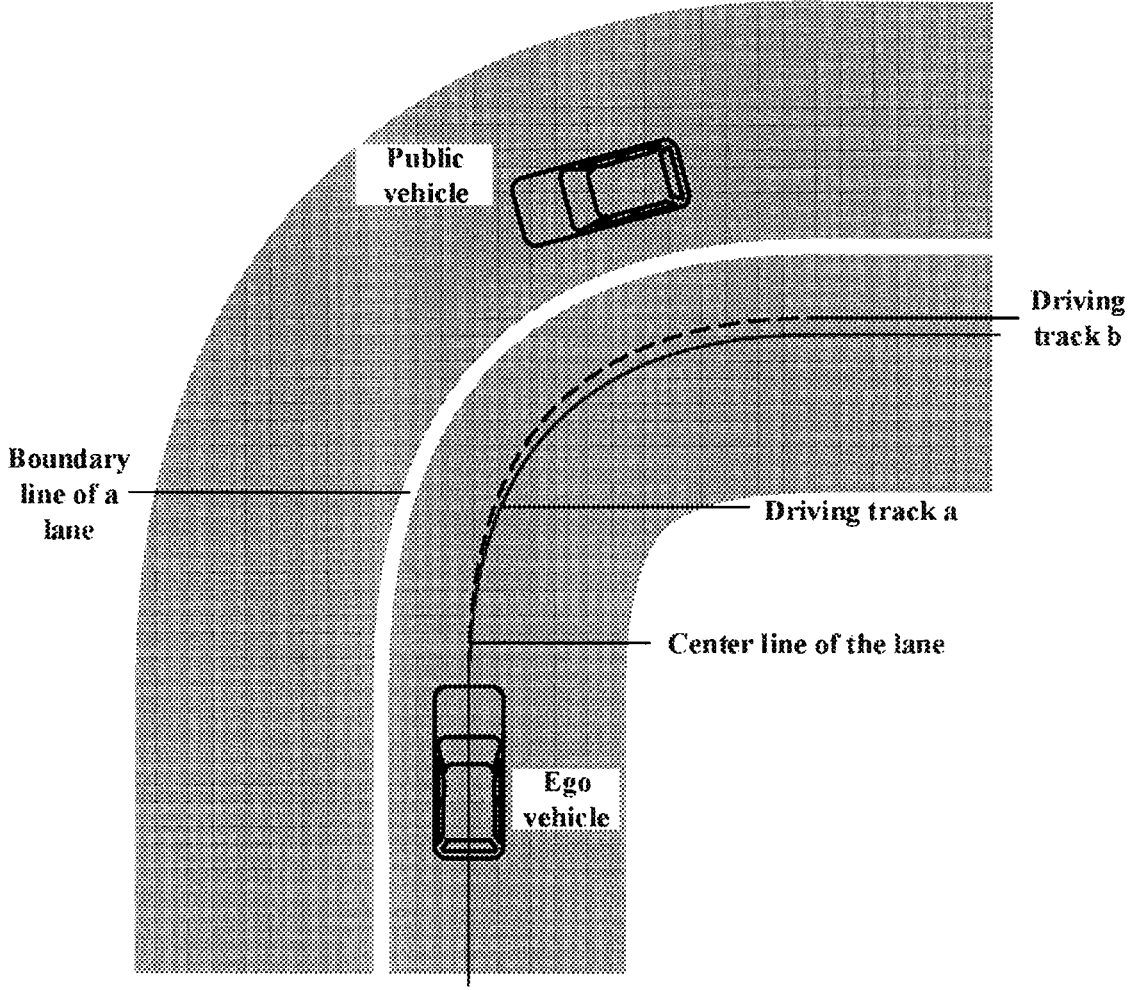
FIG. 2a is a schematic diagram of a lane keeping assistance function according to an embodiment of this application.

As shown in FIG. 2a, an automobile is traveling on a road. When the automobile deviates from a center line of a lane (a driving track b shown in FIG. 2a) during traveling, the lane keeping assistance system first sends a warning signal to a driver. If the driver does not respond correspondingly in a period of time and the automobile does not tend to return to the center line of the lane, the lane keeping assistance system sends a corresponding steering command to a steering actuator of the vehicle by using an electronic control unit (ECU), to correct a driving status of the vehicle, so that the automobile returns to the center line of the lane (a driving track a shown in FIG. 2a) for traveling, thereby ensuring driving safety. However, to implement this function, whether the vehicle deviates from the lane needs to be determined, and to determine whether the vehicle deviates from the lane, a lane line in an image photographed by the vehicle needs to be recognized. Therefore, how to quickly and accurately recognize a lane line is the most important part of the lane keeping assistance system, and quality of recognition directly affects response accuracy of the entire system.

Second Application Scenario: A Lane Departure Warning System

Figure 2B:
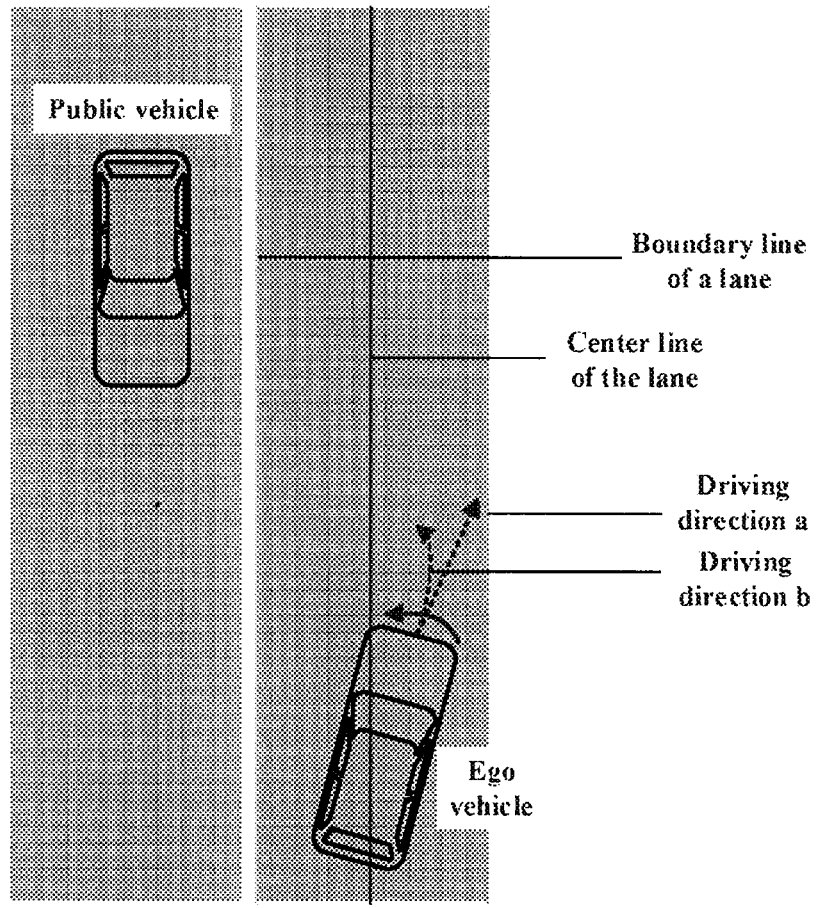
FIG. 2b is a schematic diagram of a lane departure warning function according to an embodiment of this application.

As shown in FIG. 2b, an automobile is traveling on a road. The lane departure warning system obtains dynamic vehicle parameters such as a vehicle speed and a steering status while recognizing a lane line, and determines whether the vehicle travels off a lane. When determining that the vehicle travels off the lane (a driving direction shown in FIG. 2b), the lane departure warning system notifies a driver of a current driving status by using a method such as alarming or intervention, to make the vehicle return to a correct lane for traveling (a driving direction b shown in FIG. 2b), so as to reduce occurrence of a traffic accident. For example, when a predicted driving direction coincides with an expected driving track or an included angle $\alpha$ between two lines is less than a specified value (for example, 1°), it can be determined that the automobile does not deviate; or when a predicted driving direction and an expected driving track do not coincide and an included angle $\alpha$ between two lines is less than a specified value (for example, 1°), it can be determined that the automobile has deviated from the lane. It can be understood that, to implement this function, whether the vehicle deviates from the lane needs to be determined, and to determine whether the vehicle deviates from the lane, a lane line in an image photographed by the vehicle needs to be recognized. Therefore, it is crucial to recognize the lane line in the image.

Third Application Scenario: Adaptive Cruise Control System

Figure 2C:
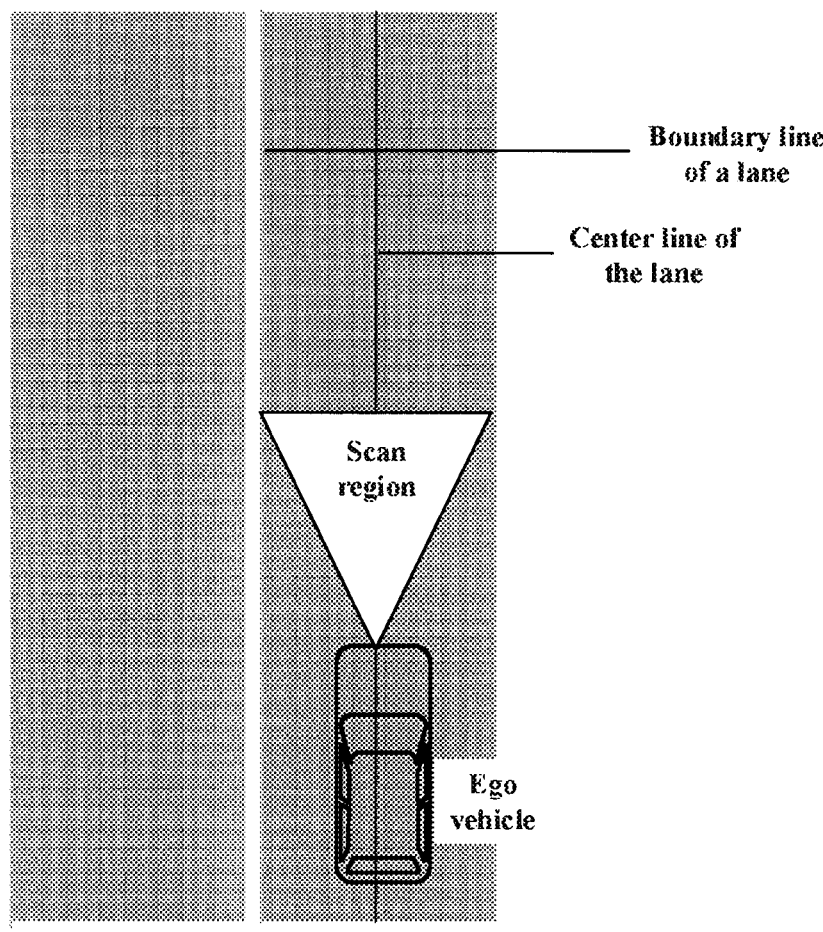
FIG. 2c is a schematic diagram of cruise control of an adaptive cruise control system according to an embodiment of this application.
Figure 2D:
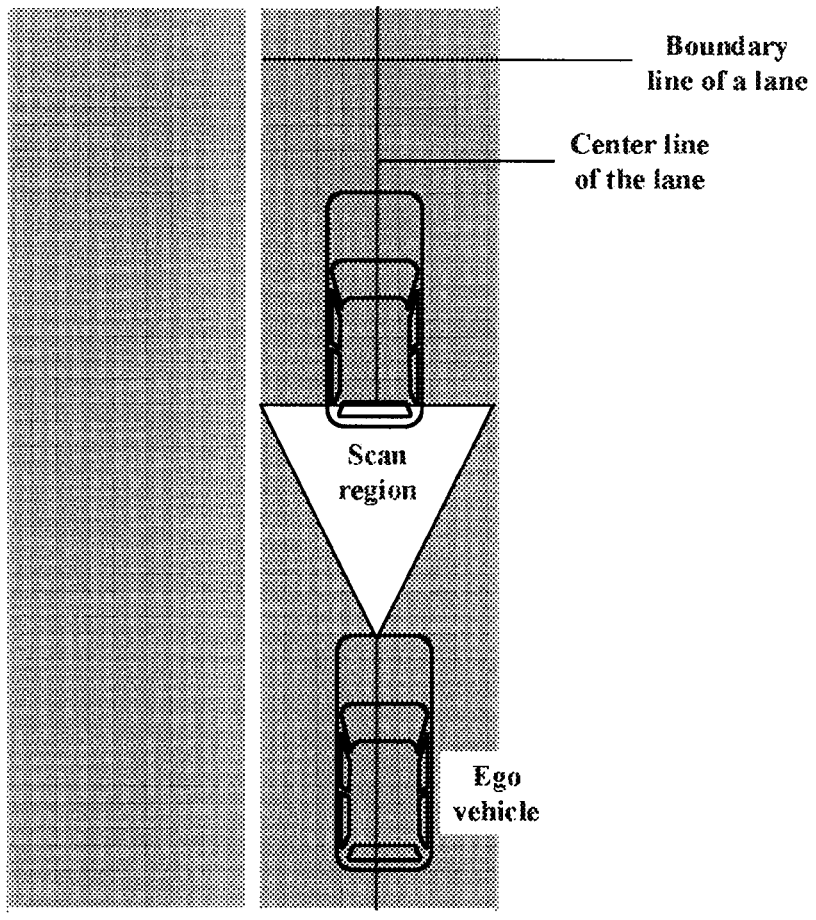
FIG. 2d is a schematic diagram of deceleration control of an adaptive cruise control system according to an embodiment of this application.
Figure 2E:
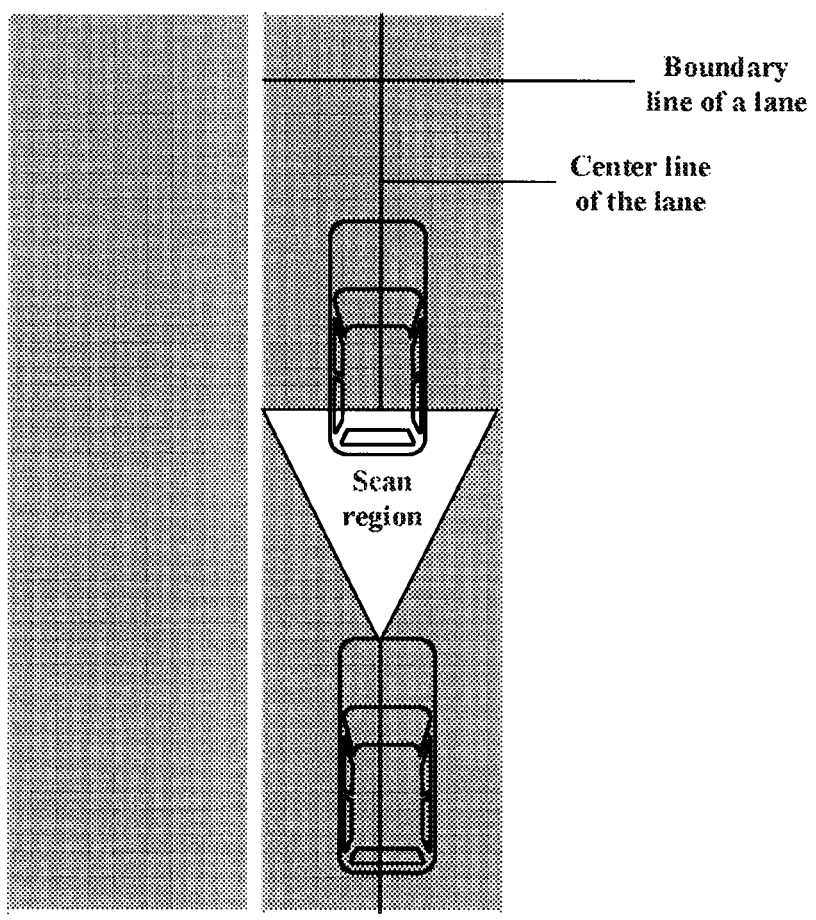
FIG. 2e is a schematic diagram of tracking control of an adaptive cruise control system according to an embodiment of this application.
Figure 2F:
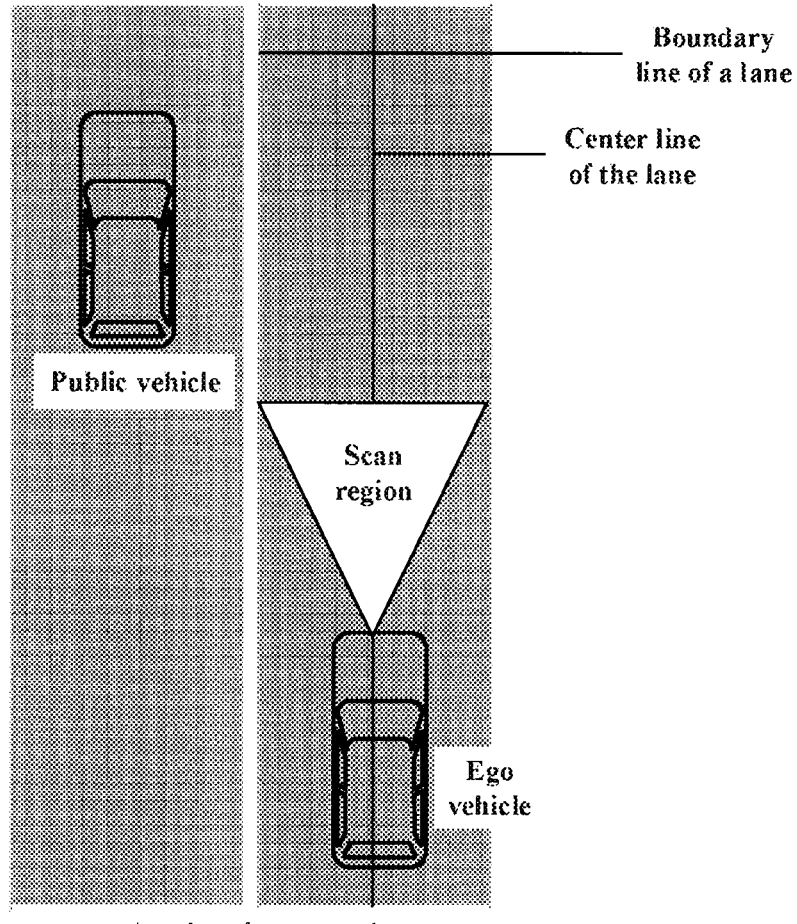
FIG. 2f is a schematic diagram of acceleration control of an adaptive cruise control system according to an embodiment of this application.

When an automobile is traveling on a road, after an adaptive cruise control setting button is turned on for the vehicle, a vehicle radar mounted in the front may continuously scan a road condition in front, and measure a distance between the vehicle and a vehicle or an obstacle in front; and may alternatively detect a lane line in real time, to help a driver better drive the vehicle in a center line of the lane. As shown in FIG. 2c, if there are no other vehicles or obstacles in front of the vehicle, the vehicle performs cruise control at a specified speed. As shown in FIG. 2d, when a traveling vehicle or an obstacle appears in front of the vehicle, the traveling vehicle or the obstacle is scanned by the radar disposed in the front of the vehicle, a controller of the adaptive cruise control system calculates vehicle data (for example, a speed and an acceleration) of the vehicle, and then sends a deceleration control signal to reduce the speed of the vehicle. As shown in FIG. 2e, when a distance between the vehicle and a vehicle in front is excessively small, or when another vehicle suddenly cuts in from front and a speed of the vehicle in front is less than that of the vehicle, the adaptive cruise control system sends a deceleration control signal to reduce the speed of the vehicle, to ensure a safe distance between the two vehicles, and performs tracking control after the speed is reduced to an expected value. When detecting that the vehicle traveling in front is accelerating, the adaptive cruise control system sends an acceleration signal, and performs tracking control after the vehicle accelerates to an expected value. As shown in FIG. 2f, when the vehicle or the vehicle traveling in front travels out of an original lane and no vehicle can travel in front, the adaptive cruise control system may send an acceleration control signal to the vehicle, so that the vehicle keeps cruising uniformly at a specified speed.

Fourth Application Scenario: Vehicle Positioning System

Currently, high-precision positioning of a self-driving vehicle is generally implemented in a combination manner (for example, a combination of absolute positioning and relative positioning). First, a basic location of the vehicle may be determined by using a global positioning system (GPS) and an inertial navigation sensor that come with the vehicle. Then matching is performed between a high-precision map, a point cloud image of a laser radar, and a characteristic of a camera image, to determine a precise location of the vehicle. In a process of performing matching based on the camera image, a lane line is usually modeled in the high-precision map as a stable road structure, and a camera of the vehicle detects a lane line during actual driving, and then performs matching against the lane line in the high-precision map, to complete positioning.

An embodiment of this application provides a lane line detection model training method. The training method is applied to training of a task/prediction model (briefly referred to as a task model below). In an embodiment, the method may be applied to training various task models constructed based on a deep neural network, including but not limited to a classification model, a recognition model, a segmentation model, and a detection model. A task model obtained by using the training method described in this application (for example, a trained lane line detection model) may be widely applied to a plurality of application scenarios (for example, a lane keeping assistance system, a lane departure warning system, and an adaptive cruise control system), such as image recognition, to make the application scenarios intelligent.

Figure 3A:
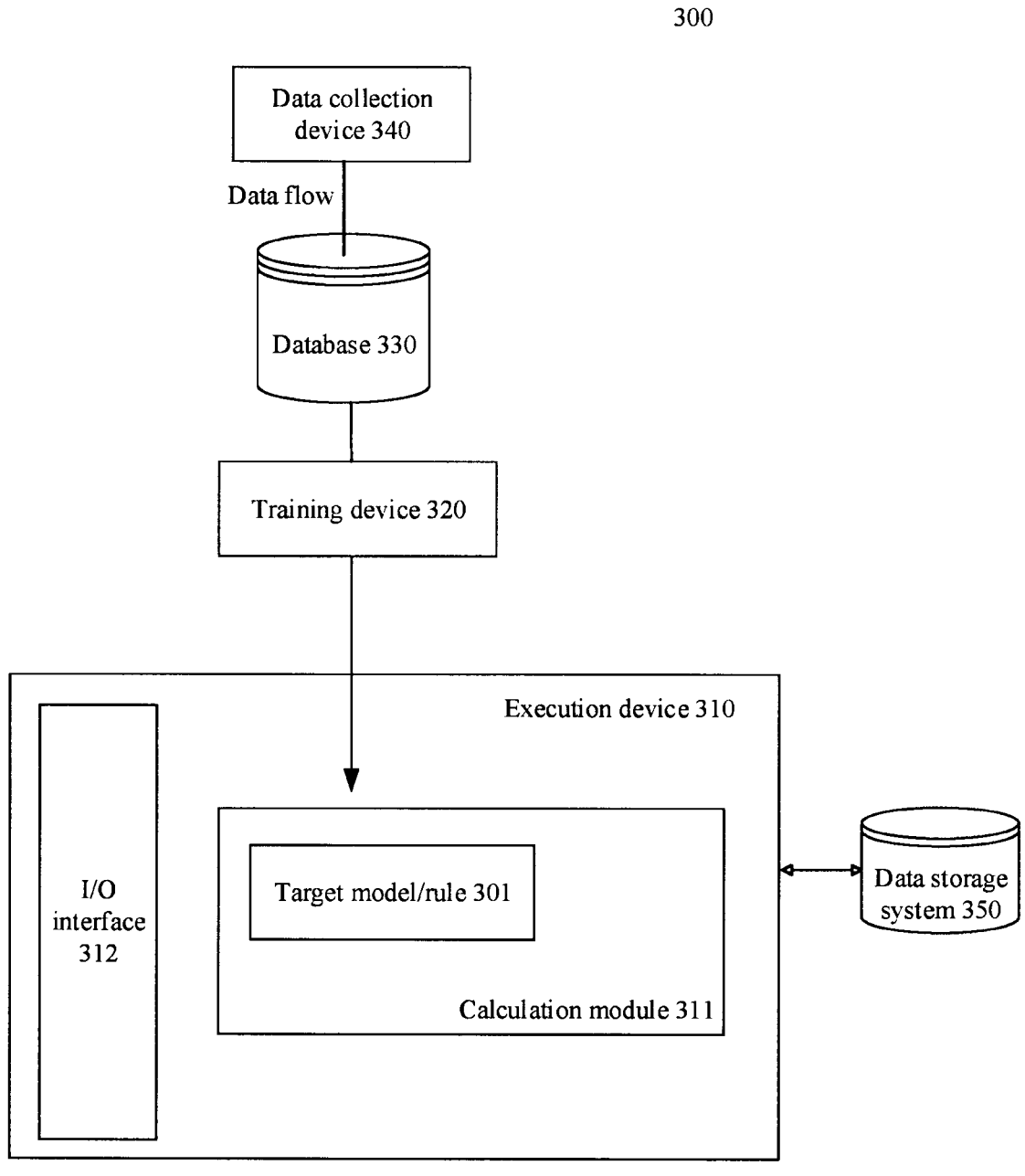
FIG. 3a is a schematic diagram of a structure of a system architecture 300 according to an embodiment of this application.

The following describes a system architecture in an embodiment of this application. FIG. 3a is a schematic diagram of a structure of a system architecture 300 according to an embodiment of this application. As shown in the system architecture 300, a data collection device 340 is configured to collect or generate training data. In an embodiment of the application, the training data may be a plurality of images with labels, or the like. For example, each image with a label includes a label indicating whether each pixel in the image belongs to a lane line region (for example, a label 1 indicates that the pixel belongs to the lane line region, and for another example, a label 0 indicates that the pixel does not belong to the lane line region), and at least three location points in a neighborhood that are associated with each pixel that belongs to the lane line region, where the three location points are on one lane line. The training data is stored in a database 330. A training device 320 generates a target model/rule 301 based on the training data maintained in the database 330. For example, the training device 320 trains a lane line detection model by using the training data with the label, until the lane line detection model is trained to reach a convergent state, to obtain a trained lane line detection model.

For example, the lane line detection model may be constructed based on a convolutional neural network or by using another classification or regression model (for example, a support vector machine SVM).

Figure 3B:
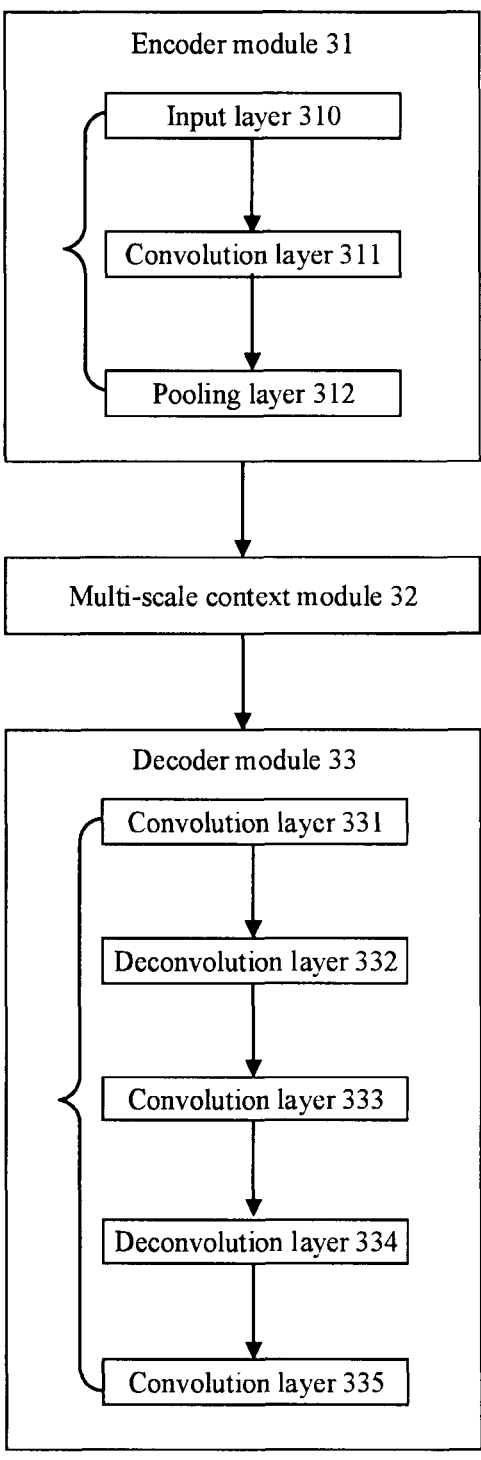
FIG. 3b is a schematic diagram of a structure of a lane line detection model according to an embodiment of this application.

For example, the lane line detection model is constructed based on the convolutional neural network. The convolutional neural network CNN detects a lane line by using an encoder-decoder architecture. For example, a structure of the lane line detection model may include an encoder module 31, a multi-scale context module 32, and a decoder module 33, as shown in FIG. 3b. In an embodiment, the encoder module 31 may include an input layer 310, a convolution layer 311, and a pooling layer 312. The input layer 310 is configured to receive input data. For example, the input data is an input image. The convolution layer 311 is configured to extract a characteristic of the input data. For example, when the input data is an image, the convolution layer 311 is configured to extract a characteristic of the input image to reduce parameters brought by the input image. The pooling layer 312 is configured to downsample data to reduce a data volume. For example, a spatial size of the image may be reduced by the pooling layer 312 during image processing. Generally, the pooling layer 312 may include an average pooling operator and/or a maximum pooling operator, to sample an input image to obtain a smaller image. The average pooling operator may be used to calculate pixel values in an image in a range, to generate an average value. The average value is used as an average pooling result. The maximum pooling operator may be used to select a pixel with a maximum value in a range as a maximum pooling result. Then the multi-scale context module 32 aggregates multi-scale context information output by the encoder module 31, and an obtained output characteristic is sent to the decoder module 33. The decoder module 33 may include a convolution layer 331, a deconvolution layer 332, a convolution layer 333, a deconvolution layer 334, and a convolution layer 335. The decoder module 33 may obtain a confidence map and a neighborhood graph. The confidence map includes a confidence value of each pixel in a lane line image. The confidence value indicates a confidence of each pixel in the lane line image belonging to a lane line region. The neighborhood graph includes at least three location points associated with a target pixel in a neighborhood. Herein, a location of the target pixel indicates that a lane line exists, and three location points are used to represent a partial structure of a lane line in the neighborhood of the target pixel.

In an embodiment, an implementation process of training the lane line detection model by the training device 320 may include the following operations.

Operation S11: Obtain a training sample. The training sample includes an image with a label. Each image with a label includes a label indicating whether each pixel in the image belongs to a lane line region, and at least three location points in a neighborhood that are associated with each pixel that belongs to the lane line region. The three location points are on one lane line. For example, the label indicating whether each pixel in the image belongs to the lane line region may be 1, which indicates that the pixel belongs to the lane line region; or the label indicating whether each pixel in the image belongs to the lane line region may be 0, which indicates that the pixel does not belong to the lane line region.

Operation S12: Train the lane line detection model by using the training sample, until the lane line detection model is trained to reach a convergent state, to obtain a trained lane line detection model.

In an example, the convergent state may include a state reached by the lane line detection model after a quantity of times of training the lane line detection model by the training device 320 reaches a preset quantity of epochs. In an embodiment, when the quantity of epochs is 1, it indicates that the training device 320 trains the lane line detection model once by using all data in a training data set. When a quantity of times of training the lane line detection model by using all the data in the training data set reaches the preset quantity of epochs, it indicates that training of the lane line detection model is completed. In this case, the lane line detection model is in the convergent state.

In an example, it is considered that the lane line detection model may be a convolutional neural network, and an error back propagation algorithm may be used in the convolutional neural network to correct a value of a parameter in an initial model during training, so that a reconstruction error loss of the initial model becomes increasingly small. In view of this, the convergent state may further include a state reached by the lane line detection model when the training device 320 trains the lane line detection model to make an output value of a loss function continuously decrease until the loss function approaches a target function.

It should be noted that, in an actual application, the training data maintained in the database 330 is not necessarily all collected by the data collection device 340, and may be received and obtained from another device. In addition, it should be noted that the training device 320 does not necessarily perform training of the target model/rule 301 completely based on the training data maintained in the database 330, and may obtain training data from a cloud side or generate training data to perform model training. The foregoing description should not be construed as a limitation on embodiments of this application.

The target model/rule 301 obtained by the training device 320 through training may be applied to different systems or devices, for example, applied to an execution device 310 shown in FIG. 3a. In an embodiment of the application, the execution device may be a vehicle-mounted terminal on a vehicle. The execution device 310 may perform a data processing method in an embodiment of the application. For example, the data processing method may include an image processing method. In FIG. 3a, the execution device 310 is equipped with an I/O interface 312, configured to exchange data with an external device. A user may input data to the I/O interface 312 by using a client device 340. In an embodiment of the application, the input data may include a to-be-recognized image or video.

In an embodiment, an implementation process of running the trained lane line detection model by the execution device 310 may include the following operations.

Operation S21: Obtain a to-be-recognized lane line image.

Operation S22: Process the to-be-recognized lane line image by using the lane line detection model, to recognize a lane line in the lane line image.

When a calculation module 311 of the execution device 310 performs computing or other related processing, the execution device 310 may invoke data, code, and the like in a data storage system 370 for corresponding processing, and may store, in the data storage system 370, data, instructions, and the like that are obtained through corresponding processing.

It should be noted that FIG. 3a is merely a schematic diagram of a system architecture according to an embodiment of the application, and a location relationship between a device, a component, and a module that are shown in the figure does not constitute any limitation. For example, in FIG. 3a, the data storage system 350 is an external memory relative to the execution device 310. In other cases, the data storage system 350 may alternatively be disposed in the execution device 310.

Figure 4A:
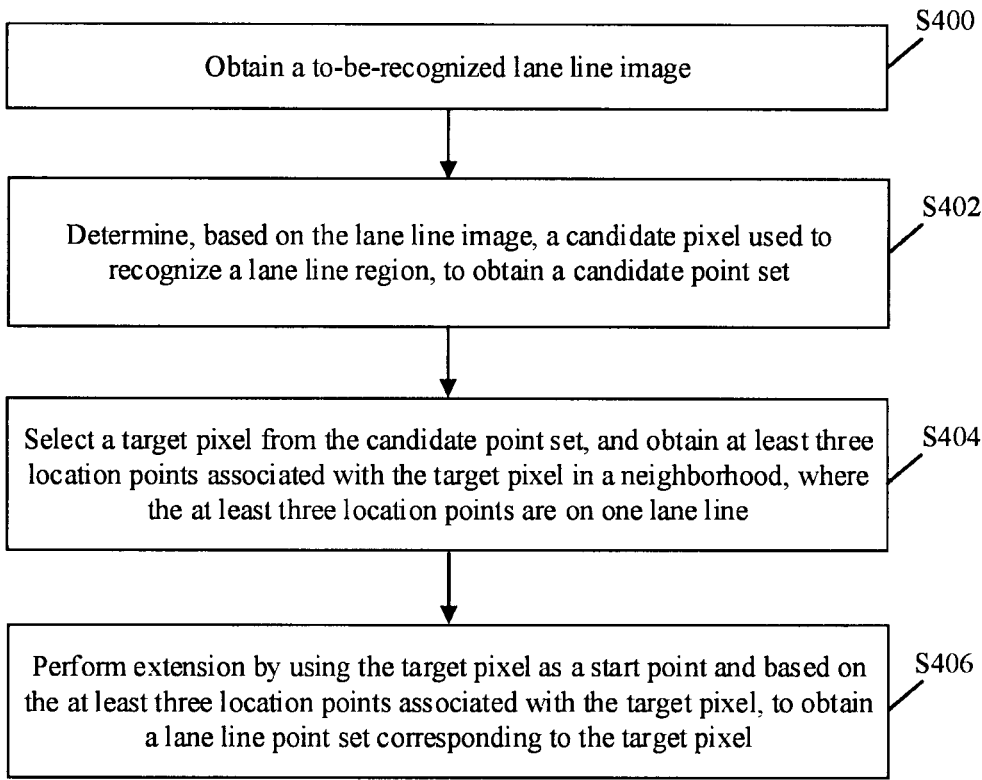
FIG. 4a is a schematic flowchart of a lane line detection method according to an embodiment of this application.

The following describes in detail the methods in embodiments of this application. FIG. 4a shows a lane line detection method according to an embodiment of this application. The method may include but is not limited to the following operations.

Operation S401: Obtain a to-be-recognized lane line image.

In an embodiment, the to-be-recognized lane line image may be obtained by a camera. For example, the camera may be disposed at a front end of a vehicle, and is configured to capture a lane line image when the vehicle is traveling. In this application, the lane line image is an image that includes a lane line. Further, the lane line image may be a single image, or may be a video frame extracted from a video, or the like.

In an example, after the camera captures the lane line image, the camera may send the lane line image to a vehicle-mounted terminal, so that the vehicle-mounted terminal processes the lane line image to obtain a lane line region.

In an example, after the camera captures the lane line image, the camera may send the lane line image to a server, so that the server processes the lane line image to obtain a lane line region. After recognizing the lane line region, the server sends the lane line region to the vehicle-mounted terminal, so that the vehicle-mounted terminal may implement a self-driving function of the vehicle in combination with a self-driving system on the vehicle.

Operation S402: Determine, based on the lane line image, a candidate pixel used to recognize the lane line region, to obtain a candidate point set, where the lane line region is a region of a location of a lane line in the lane line image and a surrounding region of the location of the lane line.

In an embodiment of the application, the candidate pixel is a pixel that is very likely to fall within the lane line region.

In an embodiment of the application, an implementation process of the determining, based on the lane line image, a candidate pixel used to recognize the lane line region, to obtain a candidate point set may include: first, generating a confidence map of the lane line image, where the confidence map includes a confidence value of each pixel in the lane line image, and the confidence value indicates a confidence of each pixel in the lane line image belonging to the lane line region. For example, for the $K^{th}$ pixel, a value of a probability that the K$^{th}$ pixel belongs to the lane line region may be calculated by using a formula (1):

$$C(k) = P_k(Y = 1 \mid X = 1) = \frac{e^{f_k(W,I)}}{1 + e^{f_k(W,I)}}, \qquad (1)$$

where $f_k$(W,I) indicates an output of the K$^{th}$ pixel.

The probability value calculated by using the formula (1) ranges from 0 to 1. It can be understood that a larger probability value corresponding to the pixel indicates a higher confidence of the pixel belonging to the lane line region. When the pixel is at a center location of a lane line (the center location is a center of a geometric shape of the lane line), the probability value is 1. For another pixel in a neighborhood of the pixel, a larger distance from the center location of the lane line indicates a smaller probability value.

Figure 4B:
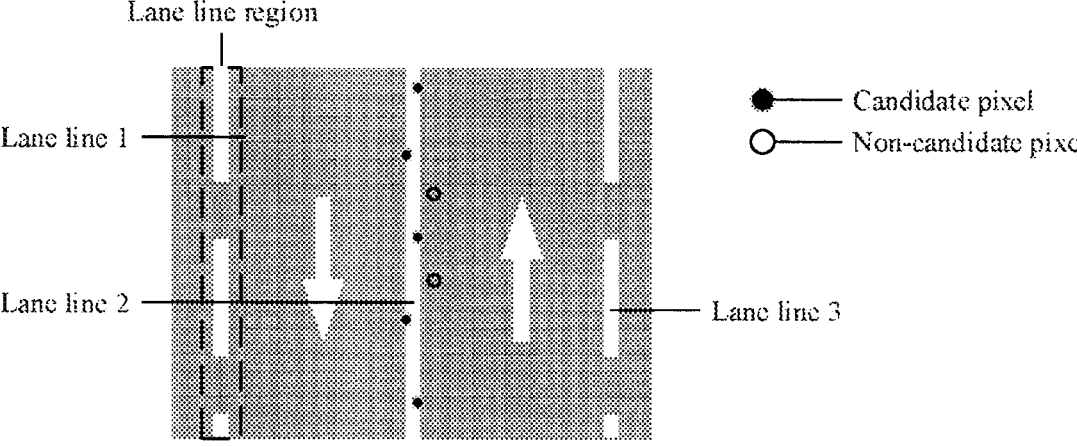
FIG. 4b is a schematic diagram of a candidate pixel according to an embodiment of this application.

For example, as shown in FIG. 4b, a lane line 1 is used as an example. A dashed-line box in the figure shows a lane line region. The lane line region may include a region of a location of the lane line, and may further include a surrounding region of the location of the lane line. In an embodiment, the surrounding region may be a region within a preset range of a distance from a center location point of the lane line. A lane line 2 is used as an example. A candidate pixel is a pixel (indicated by a black circle in the figure) that belongs to a lane line region, and a non-candidate pixel is a pixel (indicated by a white circle in the figure) that does not belong to the lane line region.

Operation S403: Select a target pixel from the candidate point set, and obtain at least three location points associated with the target pixel in a neighborhood, where the at least three location points are on one lane line.

Figures 4C, 4D:
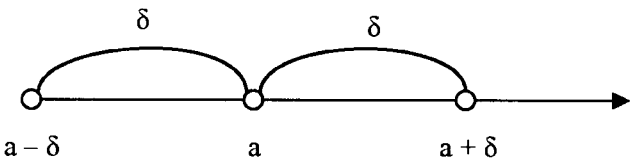
FIG. 4c is a schematic diagram of a b neighborhood of a point a according to an embodiment of this application.
FIG. 4*d* is a schematic diagram of at least three location points associated with a target pixel on a lane line closest to the target pixel according to an embodiment of this application.

FIG. 4c shows a δ neighborhood of a point a. Assuming that δ is a positive number, an open interval (a−δ,a+δ) is referred to as a δ neighborhood of the point a, and the neighborhood is denoted as U=(a,δ)={x|a−δ<x<a+δ}. The point a is referred to as a center of the neighborhood, and δ is referred to as a radius of the neighborhood. In an embodiment of the application, a value of δ is usually relatively small. For example, δ=0.5 mm. For another example, δ=0.5 cm.

In an embodiment of the application, as shown in FIG. 4d, the at least three location points associated with the target pixel in the neighborhood are location points on a lane line (a lane line 2 in FIG. 4d) closest to the target pixel. In an embodiment, a location of the target pixel indicates that a lane line exists, and three location points are used to represent a partial structure of a lane line in the neighborhood of the target pixel.

Figure 4E:
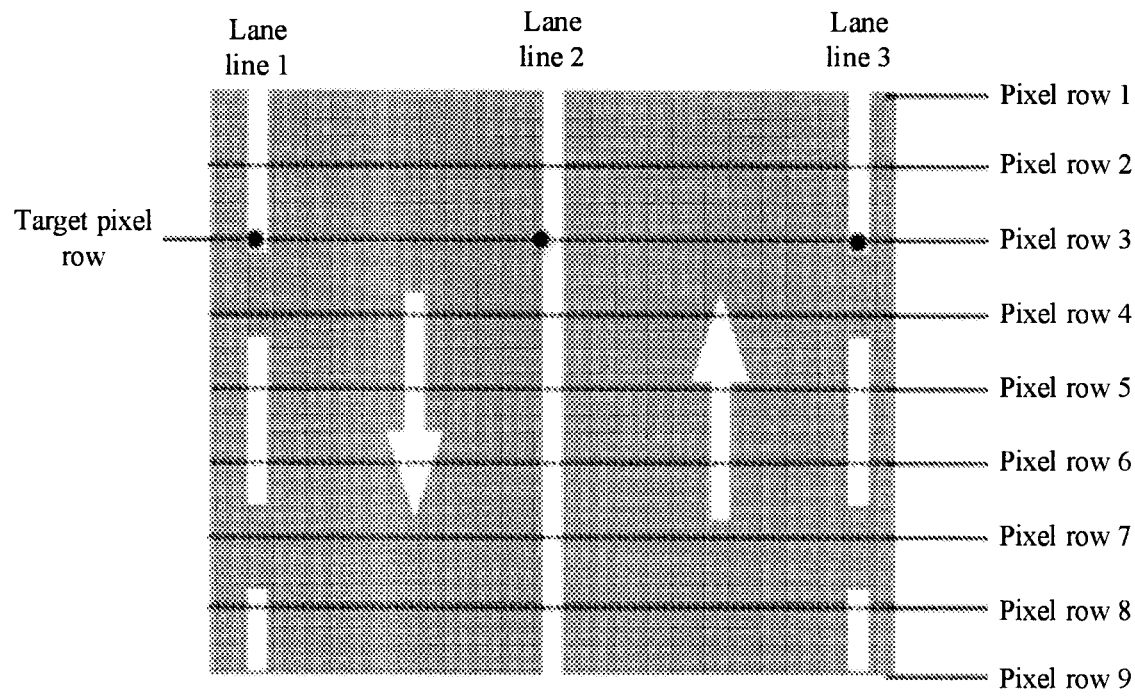
FIG. 4*e* is a schematic diagram of selecting a target pixel according to an embodiment of this application.

In some embodiments, an implementation process of the selecting a target pixel from the candidate point set may include: first, selecting a target pixel row from the lane line image based on the confidence map, where the target pixel row is a pixel row that has a largest quantity of target confidence maximums in a neighborhood in which a first pixel is located, the first pixel is a pixel whose confidence value is greater than a second confidence threshold, the target confidence maximum is greater than the second confidence threshold (for example, the second confidence value is 0.5), the confidence map includes the confidence value of each pixel in the lane line image, and the confidence value indicates the confidence of each pixel in the lane line image belonging to the lane line region; and selecting, from the target pixel row as the target pixel, all pixels whose confidence values are greater than the second confidence value, or selecting, as the target pixel, a pixel whose confidence value is greater than the second confidence value and that corresponds to a confidence maximum in a neighborhood. Because the obtained target pixel is more likely to represent a center location of a lane line, effective assurance is provided for subsequently obtaining a lane line point set corresponding to the target pixel. For example, as shown in FIG. 4e, the image includes three lane lines: a lane line 1, a lane line 2, and a lane line 3. A black point is a target confidence maximum point, and a pixel row with a largest quantity of target confidence maximum points (for example, a pixel row 3 in FIG. 4e) is selected as the target pixel row.

In actual application, the target pixel may be obtained by performing a max pooling operation in a convolutional neural network.

Figure 4F:
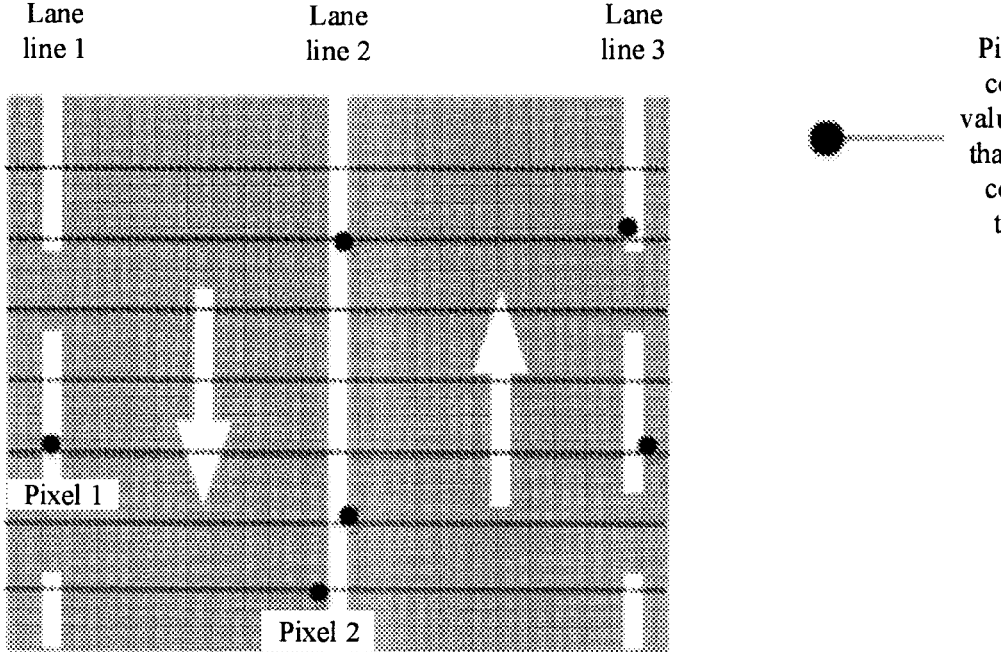
FIG. 4*f* is another schematic diagram of selecting a target pixel according to an embodiment of this application.

In some embodiments, an implementation process of the selecting a target pixel from the candidate point set may include: first, selecting a target pixel row from the lane line image based on the confidence map, where the target pixel row is a plurality of pixel rows in which a quantity of second pixels is greater than a target value (for example, the target value is ½ of a quantity of lane lines), the second pixel is a pixel whose confidence value is greater than a second confidence threshold (for example, the second confidence value is 0.5), the confidence map includes the confidence value of each pixel in the lane line image, and the confidence value indicates the confidence of each pixel in the lane line image belonging to the lane line region; and then selecting, from the target pixel row as the target pixel, all pixels whose confidence values are greater than the second confidence value. For example, as shown in FIG. 4f, the image includes three lane lines: a lane line 1, a lane line 2, and a lane line 3. A black point is a pixel whose confidence value is greater than the second confidence threshold (for example, in FIG. 4f, a confidence value corresponding to a pixel 1 is 1, and a confidence value corresponding to a pixel 2 is 0.7), and all pixels whose confidence values are greater than the second confidence value are selected as the target pixel.

To sum up, in the target pixel determining method described in this application, it can be ensured that a plurality of determined target pixels cover all lane lines included in the lane line image as far as possible, to avoid missed detection.

Operation S406: Perform extension by using the target pixel as a start point and based on the at least three location points associated with the target pixel, to obtain a lane line point set corresponding to the target pixel.

In an embodiment of the application, a lane line point set indicates a complete lane line. It can be understood that a quantity of lane line point sets is the same as a quantity of lane lines.

Figure 4G:
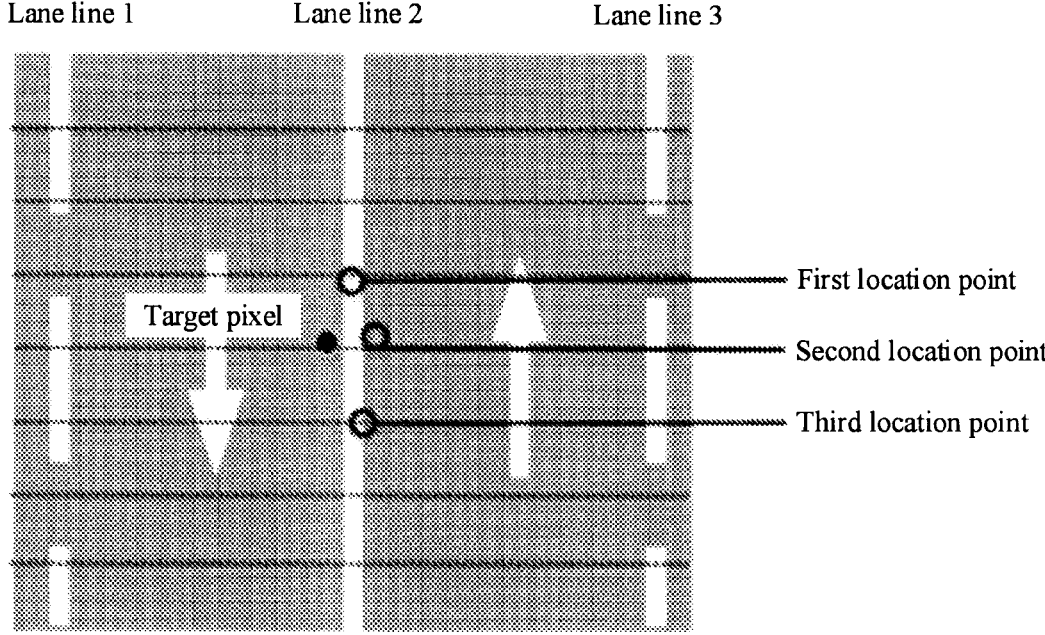
FIG. 4*g* is a schematic diagram of a target pixel and at least three location points associated with the target pixel in a neighborhood according to an embodiment of this application.

In an embodiment of the application, as shown in FIG. 4g, the three location points include a first location point, a second location point, and a third location point, N (for example, N=1) rows above a pixel row in which the target pixel is located are pixel rows in which the first location point is located, the pixel row in which the target pixel is located is the same as that in which the second location point is located, M (for example, M=1) rows under the pixel row in which the target pixel is located are pixel rows in which the third location point is located. An implementation process of the performing extension by using the target pixel as a start point and based on the at least three location points associated with the target pixel may include the following operations.

First, a start location of the target pixel is adjusted based on a first offset, to obtain a final location of the target pixel, where the first offset is an offset from the target pixel to the second location point. For example, when the target pixel is a pixel obtained through upward extension, the final location of the target pixel may be expressed as $$P_k^{up} = (x(P_k^{up}) + \Delta x_{same}(P_k^{up}), y(P_k^{up})),$$

where $$x(P_k^{up})$$

indicates to take a horizontal coordinate of the pixel $$P_k^{up}$$

obtained through extension, $$y(P_k^{up})$$

indicates to take a vertical coordinate of the pixel $$P_k^{up}$$

obtained through extension, and $\Delta x_{same}$ indicates the first offset. For example, when the target pixel is a pixel obtained through downward extension, $$P_k^{down} = \left(x\left(P_k^{down}\right) + \Delta x_{same}\left(P_k^{down}\right), y\left(P_k^{down}\right)\right),$$

where $$x(P_k^{up})$$

indicates to take a horizontal coordinate of the pixel $$P_k^{up}$$

obtained through extension, $$y(P_k^{up})$$

28 indicates to take a vertical coordinate of the pixel $$P_k^{up}$$

obtained through extension, and $\Delta x_{same}$ indicates the first offset. In this implementation, a precise location of a lane line may be gradually optimized, and another lane line point is extended from a pixel at a center location of the lane line, so that accuracy of lane line detection can be improved.

Then a first lane line point that is obtained by performing extension on the target pixel based on a second offset is obtained by using the final location of the target pixel as a start point, where the second offset is an offset from the target pixel to the first location point.

For example, the first lane line point may be expressed as $$P_k^{up} = (x(P_k) + \Delta x_{up}(P_k), y(P_k) - N),$$

where $(P_k)$ is a pixel, $x(P_k)$ indicates to take a horizontal coordinate of the pixel $P_k$,$y(P_k)$ indicates to take a vertical coordinate of the pixel $P_k$, and N indicates a quantity of pixel rows between the pixel row in which the target pixel is located and the pixel row in which the first location point is located.

In addition, a second lane line point that is obtained by performing extension on the target pixel based on a third offset is further obtained, where the third offset is an offset from the target pixel to the third location point. For example, the second lane line point may be expressed as $$P_k^{down} = (x(P_k) + \Delta x_{down}(P_k), y(P_k) + M),$$

where $(P_k)$ is a pixel, $x(P_k)$ indicates to take a horizontal coordinate of the pixel $P_k$,$y(P_k)$ indicates to take a vertical coordinate of the pixel $P_k$, and M indicates a quantity of pixel rows between the pixel row in which the target pixel is located and the pixel row in which the third location point is located.

Figure 4H:
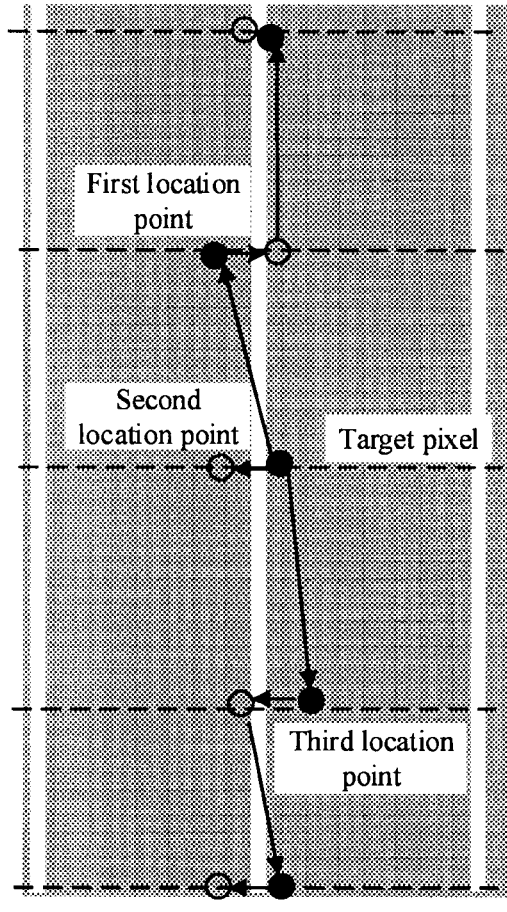
FIG. 4*h* is a schematic diagram of an operation of extending a lane line point according to an embodiment of this application.

When a confidence value corresponding to the first lane line point is greater than a first confidence value, an operation of obtaining a first lane line point that is obtained by performing extension on the target pixel based on the first offset and the second offset is performed by using the first lane line point as a current target pixel, until a confidence value corresponding to a first lane line point obtained through extension is not greater than the first confidence value (for example, the first confidence value is 0.8). When a confidence value corresponding to the second lane line point is greater than the first confidence value, an operation of obtaining a second lane line point that is obtained by performing extension on the target pixel based on the first offset and the third offset is performed by using the second lane line point as a current target pixel, until a confidence value corresponding to a second lane line point obtained through extension is not greater than the first confidence value. For example, as shown in FIG. 4h, extension may be performed by using the foregoing method to obtain a lane line point set corresponding to each pixel. In this implementation, it can be ensured that all lane line points obtained through extension are pixels belonging to the lane line region, thereby avoiding extension based on an invalid lane line point, so that a lane line can be quickly and accurately recognized.

In some embodiments, the at least three location points include a fourth location point and a fifth location point, N rows above a pixel row in which the target pixel is located are pixel rows in which the fourth location point is located, M rows under the pixel row in which the target pixel is located are pixel rows in which the fifth location point is located, and M and N are integers greater than 0. The performing extension by using the target pixel as a start point and based on the at least three location points associated with the target pixel includes obtaining, by using a start location of the target pixel as a start point, a third lane line point that is obtained by performing extension on the target pixel based on a fourth offset, where the fourth offset is an offset from the target pixel to the fourth location point.

For example, the third lane line point may be expressed as $$P_k^{up} = (x(P_k) + \Delta x_{up}(P_k), y(P_k) - N),$$

where $(P_k)$ is a pixel, $x(P_k)$ indicates to take a horizontal coordinate of the pixel $P_k$, $y(P_k)$ indicates to take a vertical coordinate of the pixel $P_k$, and N indicates a quantity of pixel rows between the pixel row in which the target pixel is located and the pixel row in which the first location point is located.

In addition, a fourth lane line point that is obtained by performing extension on the target pixel based on a fifth offset is further obtained, where the fifth offset is an offset from the target pixel to the fifth location point.

For example, the fourth lane line point may be expressed as $$P_k^{down} = (x(P_k) + \Delta x_{down}(P_k), y(P_k) + M),$$

where $(P_k)$ is a pixel, $x(P_k)$ indicates to take a horizontal coordinate of the pixel $P_k$, $y(P_k)$ indicates to take a vertical coordinate of the pixel $P_k$, and M indicates a quantity of pixel rows between the pixel row in which the target pixel is located and the pixel row in which the third location point is located.

When a confidence value corresponding to the third lane line point is greater than a first confidence value, an operation of obtaining a third lane line point that is obtained by performing extension on the target pixel based on the fourth offset is performed by using the third lane line point as a current target pixel, until a confidence value corresponding to a third lane line point obtained through extension is not greater than the first confidence value (for example, the first confidence value is 0.8). When a confidence value corresponding to the fourth lane line point is greater than the first confidence value, an operation of obtaining a fourth lane line point that is obtained by performing extension on the target pixel based on the fifth offset is performed by using the fourth lane line point as a current target pixel, until a confidence value corresponding to a fourth lane line point obtained through extension is not greater than the first confidence value. In this implementation, it can be ensured that all lane line points obtained through extension are pixels belonging to the lane line region, so that a lane line can be quickly and accurately recognized.

It should be noted that, in the foregoing descriptions, an example in which an instance point obtained through extension is the second lane line point is used for description. That "the confidence value corresponding to the second lane line point is greater than the first confidence value" indicates that the second lane line point obtained through extension is a valid extended instance point. In this case, the valid extended instance point may be used as a start point to continue to perform extension, to find more valid extended instance points. That "the confidence value corresponding to the second lane line point is not greater than the first confidence value (for example, the confidence value corresponding to the second lane line point is less than the first confidence value, or the confidence value corresponding to the second lane line point is equal to the first confidence value)" indicates that the second lane line point obtained through extension is an invalid extended instance point. In this case, extension is stopped. It should be noted that, when an instance point obtained through extension goes beyond a range of the lane line image (that is, the instance point obtained through extension does not belong to the lane line image), it may be considered that the instance point obtained through the extension is an invalid extended instance point. In this case, extension is stopped.

In some embodiments, the three location points include a sixth location point, a seventh location point, and an eighth location point, N (for example, N=1) rows above a pixel row in which the target pixel is located are pixel rows in which the sixth location point is located, the pixel row in which the target pixel is located is the same as that in which the seventh location point is located, and M (for example, M=1) rows under the pixel row in which the target pixel is located are pixel rows in which the eighth location point is located. An implementation process of the performing extension by using the target pixel as a start point and based on the at least three location points associated with the target pixel may include: adjusting a start location of the target pixel by using the target pixel as a start point and based on a sixth offset, to obtain a sixth lane line point, where the sixth offset is an offset from the target pixel to the second location point; obtaining a candidate pixel closest to the sixth location point based on a seventh offset, to obtain a seventh lane line point, and obtaining an eighth lane line point that is obtained by performing extension on the seventh lane line point based on the sixth offset; and obtaining a candidate pixel closest to the eighth location point based on an eighth offset, to obtain a ninth lane line point, and obtaining a tenth lane line point that is obtained by performing extension on the ninth lane line point based on the sixth offset, where the sixth lane line point, the eighth lane line point, and the tenth lane line point are used to constitute the lane line point set corresponding to the target pixel.

Figure 4I:
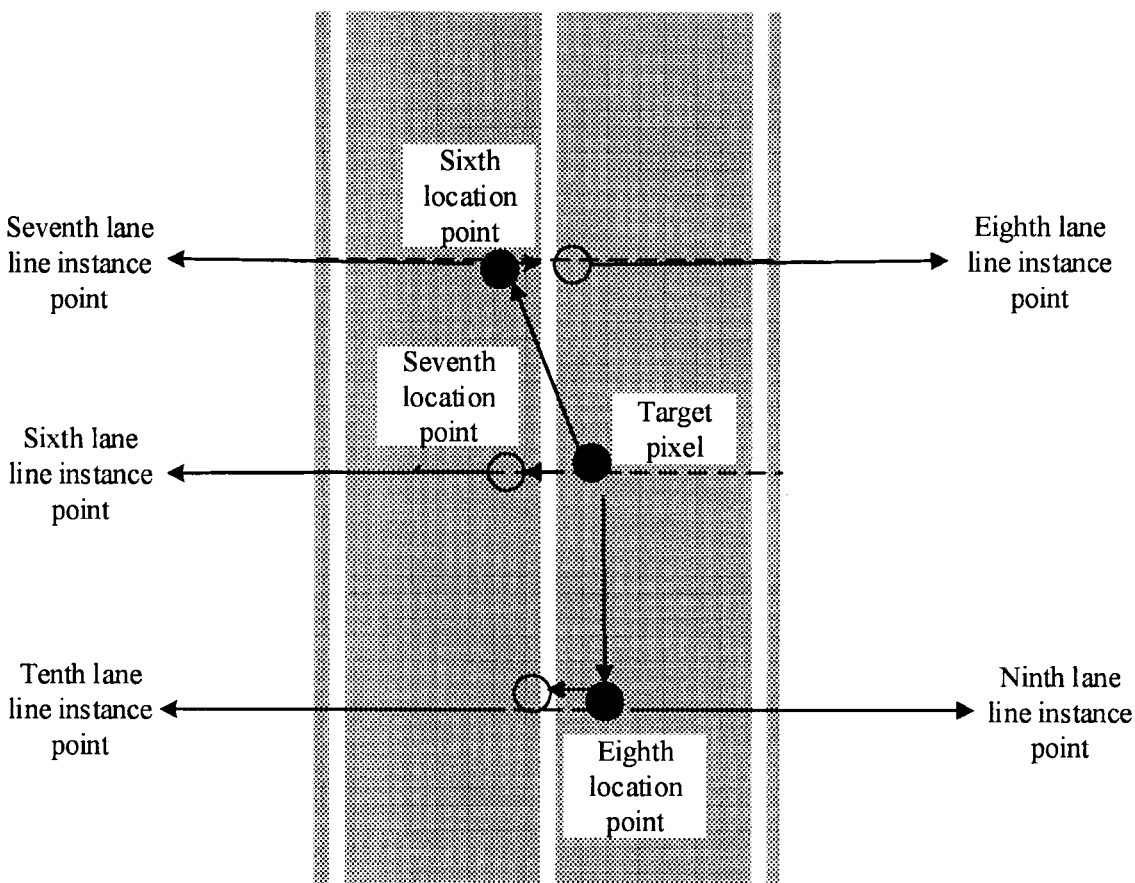
FIG. 4*i* is a schematic diagram of an operation of extending a lane line point according to an embodiment of this application.
Figure 4J:
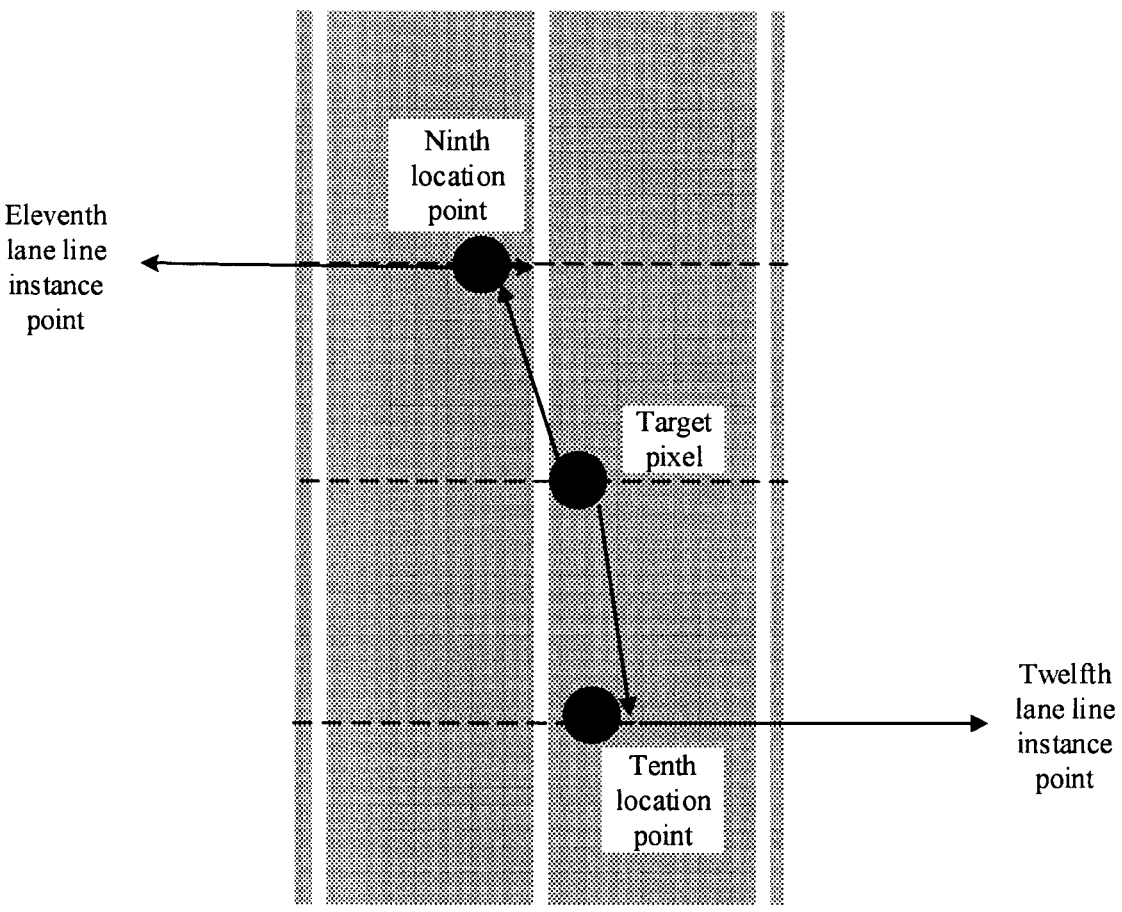
FIG. 4*j* is a schematic diagram of an operation of extending a lane line point according to an embodiment of this application.
Figure 4K:
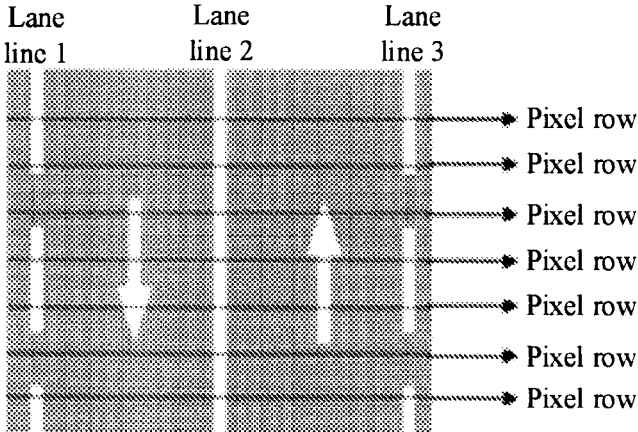
FIG. 4*k* is a schematic diagram of a pixel row according to an embodiment of this application.
Figure 5A:
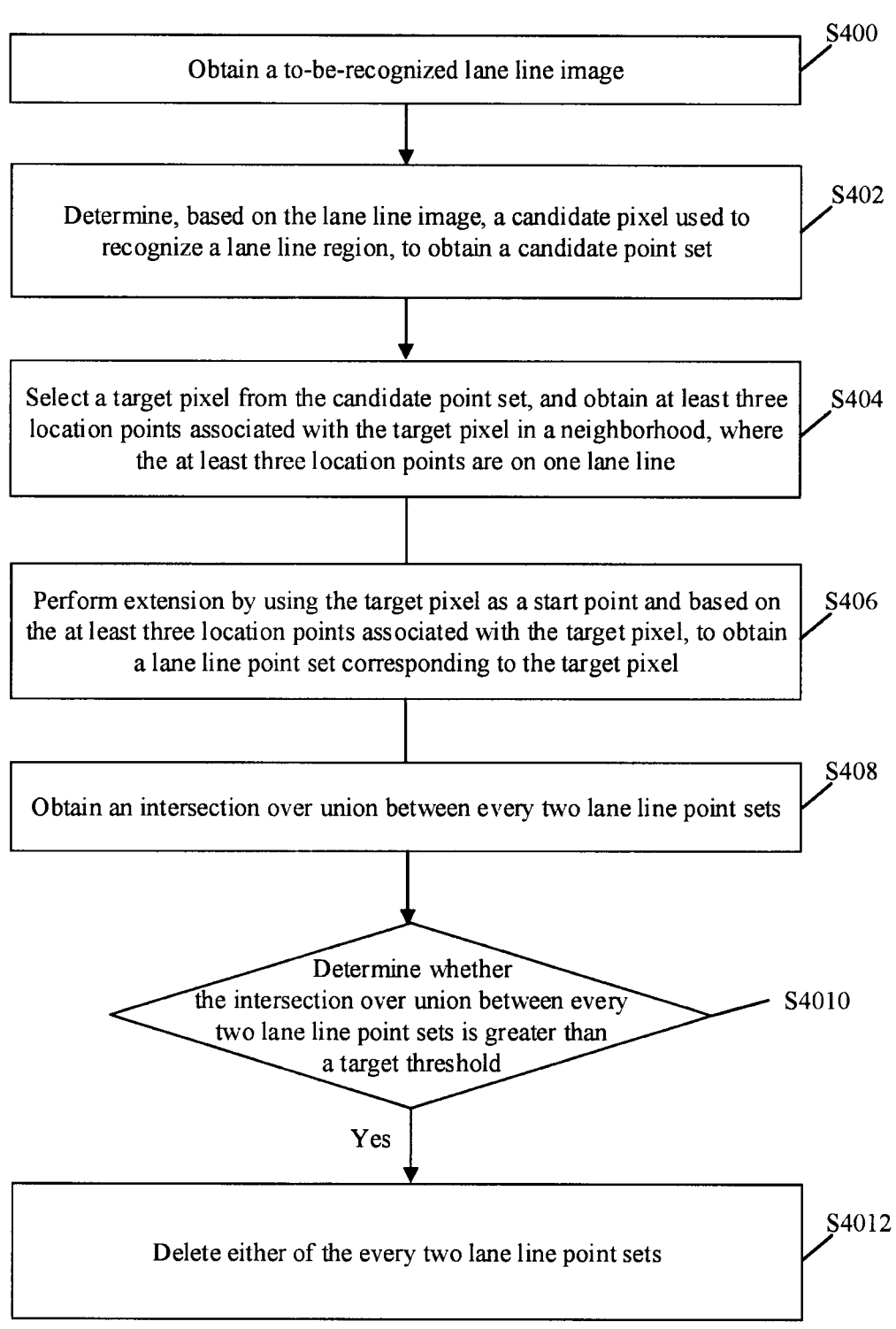
FIG. 5*a* is a schematic flowchart of another lane line detection method according to an embodiment of this application.
Figure 5B:
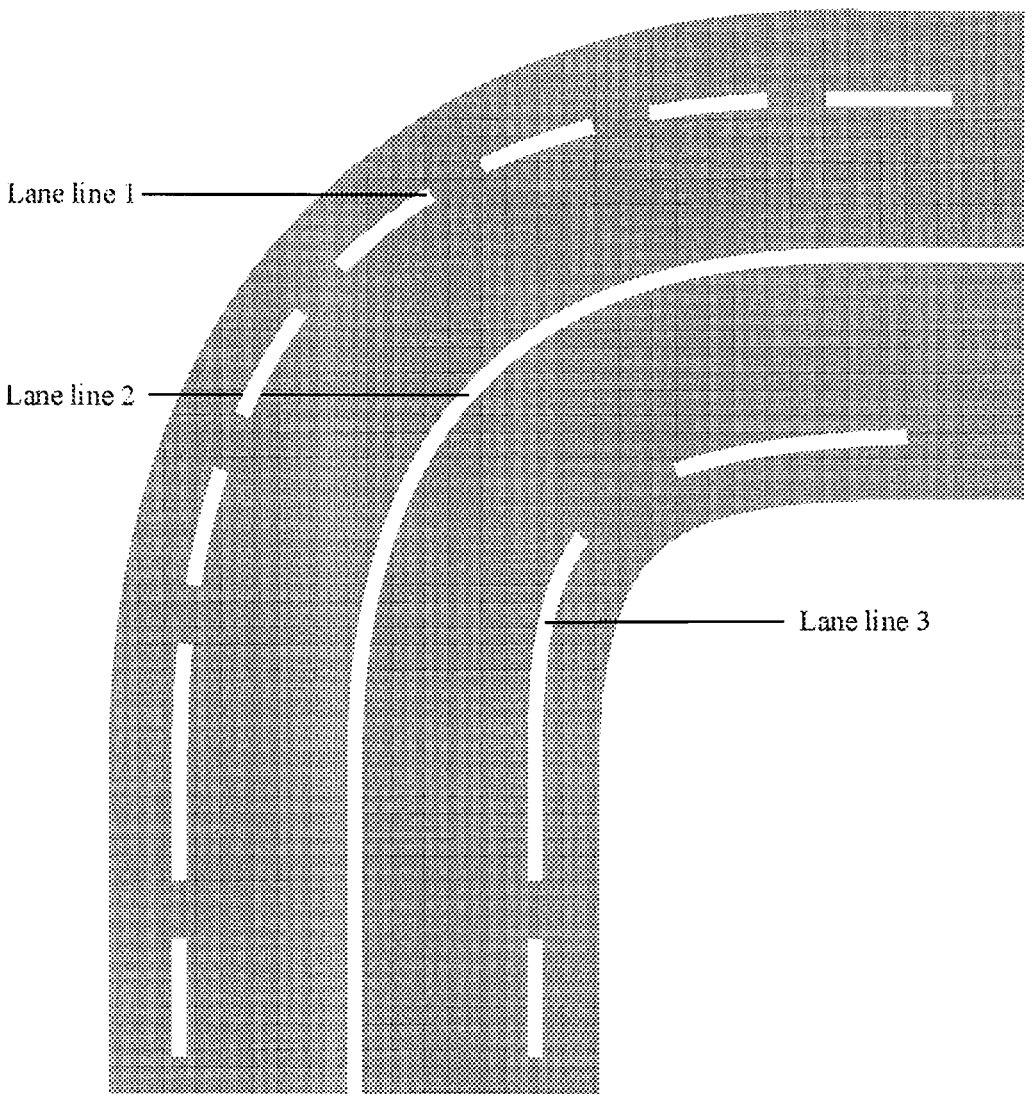
FIG. 5*b* is a schematic diagram of a lane line image according to an embodiment of this application.
Figure 5C:
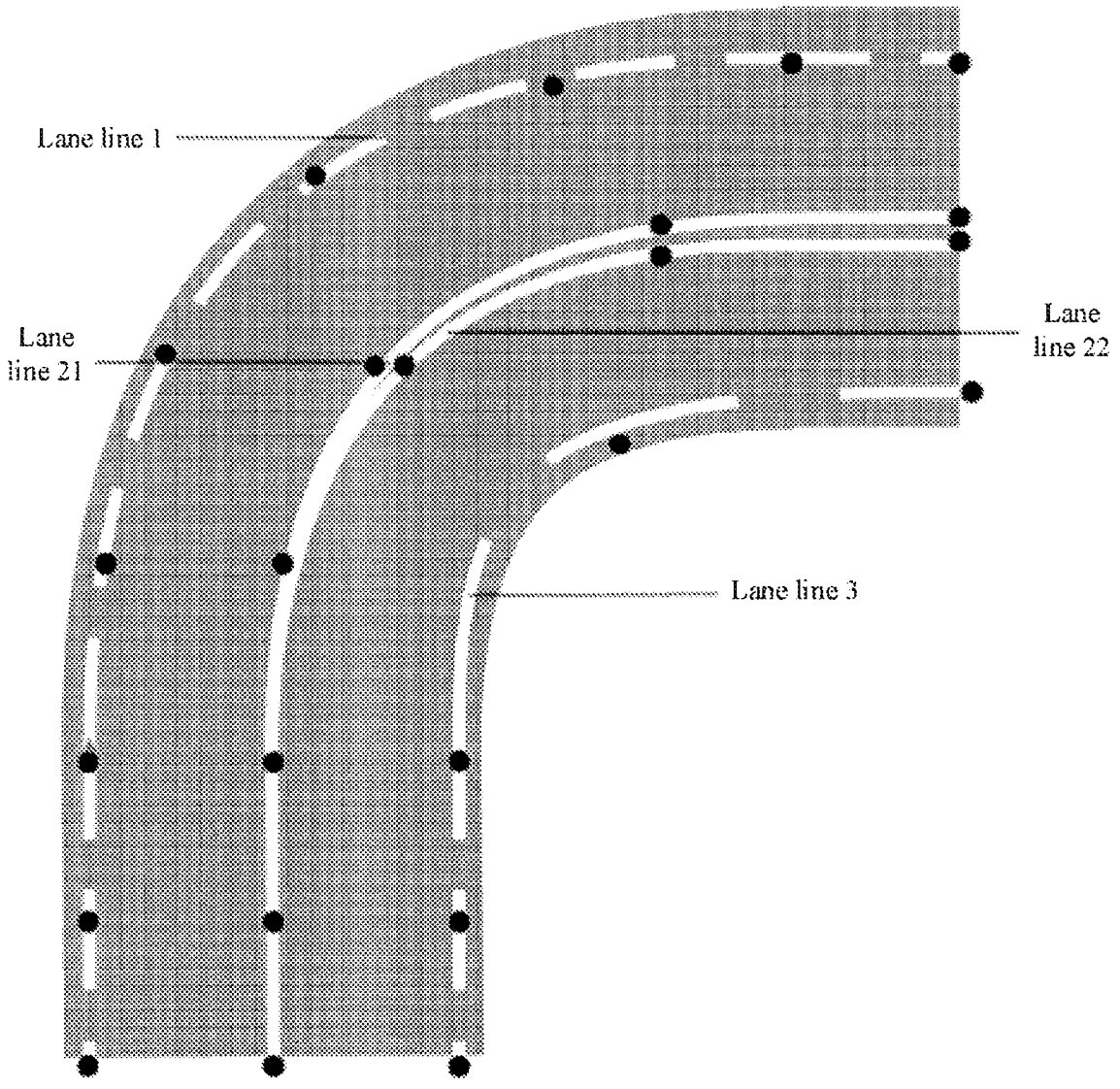
FIG. 5*c* is a schematic diagram of a recognition result of a lane line image according to an embodiment of this application.
Figure 5D:
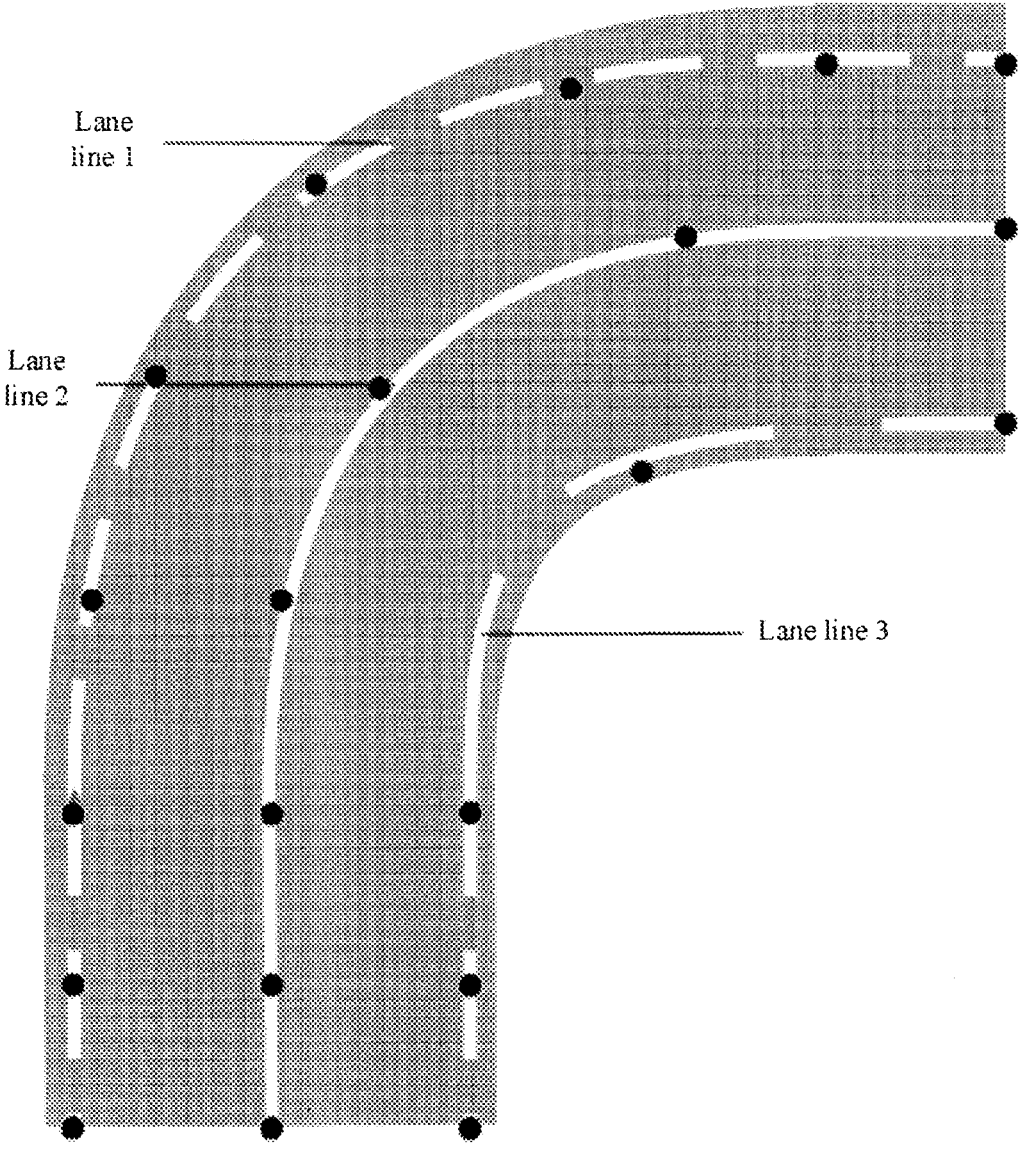
FIG. 5*d* is a schematic diagram of another recognition result of a lane line image according to an embodiment of this application.
Figure 5E:
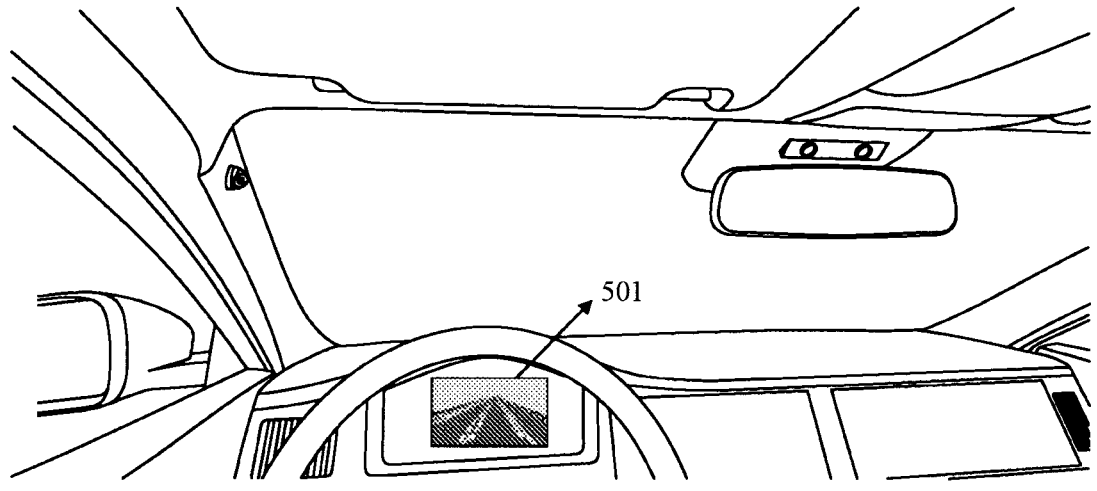
FIG. 5*e* is a schematic diagram of displaying a recognition result of a lane line image by using a central control screen according to an embodiment of this application.

For example, as shown in FIG. 4i, in the $2^{nd}$ pixel row, the start location of the target pixel is adjusted in the same pixel row by using the target pixel as a start point and based on the sixth offset, and a pixel at the location (for example, a sixth lane line point shown in FIG. 4i) is obtained. Then, in N rows above the pixel row, a candidate pixel closest to the sixth location point (for example, a seventh lane line point shown in FIG. 4i) is obtained based on the seventh offset, and extension is performed on the candidate pixel based on the sixth offset to obtain an eighth lane line point. In M rows under the pixel row, a candidate pixel closest to the eighth location point (for example, a ninth lane line point shown in FIG. 4i) is obtained based on the eighth offset, and extension is performed on the candidate pixel based on the sixth offset to obtain a tenth lane line point, so that the lane line point set corresponding to the target pixel can be obtained. It can be understood that, when there are a plurality of target pixels, lane line point sets corresponding to the pixels may be obtained in parallel by using the foregoing method.

In some embodiments, the three location points include a ninth location point and a tenth location point, N (for example, N=1) rows above a pixel row in which the target pixel is located are pixel rows in which the ninth location point is located, and M (for example, M=1) rows under the pixel row in which the target pixel is located are pixel rows in which the tenth location point is located. An implementation process of the performing extension by using the target pixel as a start point and based on the at least three location points associated with the target pixel may include: obtaining a candidate pixel closest to the ninth location point by using the target pixel as a start point and based on a ninth offset, to obtain an eleventh lane line point; and obtaining a candidate pixel closest to the tenth location point based on a tenth offset, to obtain a twelfth lane line point.

For example, as shown in FIG. 4$j$, in the $2^{nd}$ pixel row, a candidate pixel closest to the ninth location point (for example, an eleventh lane line point shown in FIG. 4$j$) is obtained by using the target pixel as a start point and based on the ninth offset, and a candidate pixel closest to the tenth location point (for example, a twelfth lane line point shown in FIG. 4$j$) is obtained based on the tenth offset, so that the lane line point set corresponding to the target pixel can be obtained. It can be understood that, when there are a plurality of target pixels, lane line point sets corresponding to the pixels may be obtained in parallel by using the foregoing method.

It should be further noted that, in an embodiment of the application, M and N may have a same value, or may have different values. For example, M=N=1. For another example, M=N=2. As shown in FIG. 4$k$, a dashed line indicates a pixel row. There may be 10 pixels, 3 pixels, or a quantity of pixels between adjacent pixel rows. The quantity is a value that falls within a fluctuation range (for example, 50%) of a specified value by using the specified value as a reference.

To sum up, in the foregoing method described in this application, a lane line relatively close to a current location of a vehicle can be quickly and accurately detected, and a lane line currently relatively far away from a lane can also be quickly and accurately detected, that is, extensibility of a lane line can be well reflected. This provides a basis for self-driving, and can further ensure safety during self-driving.

In an embodiment of the application, a lane line detection device may obtain, by using the target pixel as a start point and based on the at least three locations associated with the target pixel, other instance points of the lane line that are obtained by extending the target pixel, and then obtain the lane line point set. In this implementation, the lane line in the lane line image can be quickly and accurately recognized.

When target pixels come from a plurality of pixel rows, a lane line point set (including a lane line point set corresponding to each target pixel) obtained by using the foregoing method may include duplicate lane line points. In view of this, as shown in FIG. 5$a$, based on the method shown in FIG. 4$a$, this method embodiment describes how to remove duplicate lane line points, and may include but is not limited to the following operations.

Operation S408: Obtain an intersection over union between every two lane line point sets.

In an example, after a lane line point set corresponding to each pixel is obtained, an intersection over union between every two lane line point sets is calculated among a plurality of lane line point sets.

In an example, after a lane line point set corresponding to each pixel is obtained, a score of each lane line point set may be determined based on confidence values corresponding to all pixels in the lane line point set. Then the lane line point sets are sorted based on the scores. For example, the lane line point sets may be sorted in descending order of the scores or in ascending order of the scores. Then an intersection over union between every two lane line point sets is calculated among lane line point sets whose scores are greater than a specified threshold (for example, the specified threshold may be obtained by averaging confidence values corresponding to all pixels in the confidence map).

In an embodiment of the application, an intersection over union IOU between two lane line point sets is defined as follows:

$$IOU(Inst^1, Inst^2) = \{Inst^1 \Omega Inst^2\} / \{[Inst^1] + [Inst^2] - [Inst^1 \Omega Inst^2]\}, \text{ where}$$

$Inst^1$ indicates a lane line point 1, and $Inst^2$ indicates a lane line point 2. When the two lane line point sets each include two lane line points, row numbers, that is, vertical coordinates (y), of pixel rows in which the lane line points are located are the same, and a difference between horizontal coordinates (x) is less than a specified threshold, it may be considered that the two lane lines coincide in the pixel row.

In an embodiment, a quantity of lane line points that coincide in every two lane line point sets may be obtained, and then an intersection over union between every two lane line point sets is determined based on the quantity of lane line points that coincide.

Operation S4010: Determine whether the intersection over union between every two lane line point sets is greater than a target threshold, and if the intersection over union between every two lane line point sets is greater than the target threshold, perform operation S4012.

In an embodiment of the application, a value of the target threshold is not specifically limited. For example, the target threshold may be autonomously set by the lane line detection device, or may be set by the lane line detection device according to a requirement of a user. For example, the target threshold is 0.85.

Operation S4012: Delete either of the every two lane line point sets.

For example, the lane line image is shown in FIG. 5$b$, and the lane line image includes three lane lines: a lane line 1, a lane line 2, and a lane line 3. Because the determined target pixel comes from a plurality of pixel rows, a lane line point set corresponding to each target pixel may be shown in FIG. 5$c$. In FIG. 5$c$, it can be learned that there are two recognition results for the lane line 2: a lane line 21 and a lane line 22. In this case, either of the every two lane line point sets is deleted. In this case, a recognition result for the lane line image may be shown in FIG. 5$d$.

In an embodiment of the application, when determining that the intersection over union between every two lane line point sets is greater than the target threshold, the lane line detection device deletes either of the every two lane line point sets, so that accuracy of a lane line recognition result can be ensured, and false detection is avoided.

It should be noted that, in an embodiment of the application, after the lane line point set corresponding to each target pixel is obtained, as shown in FIG. 5$e$, the recognition result for the lane line image may be displayed on a central control screen 501 of the vehicle, so that a self-driving apparatus or a driver performs driving based on the recognition result.

FIG. 1a to FIG. 5d describe in detail the lane line detection method in embodiments of this application. The following describes an apparatus in embodiments of this application with reference to the accompanying drawings.

Figure 6:
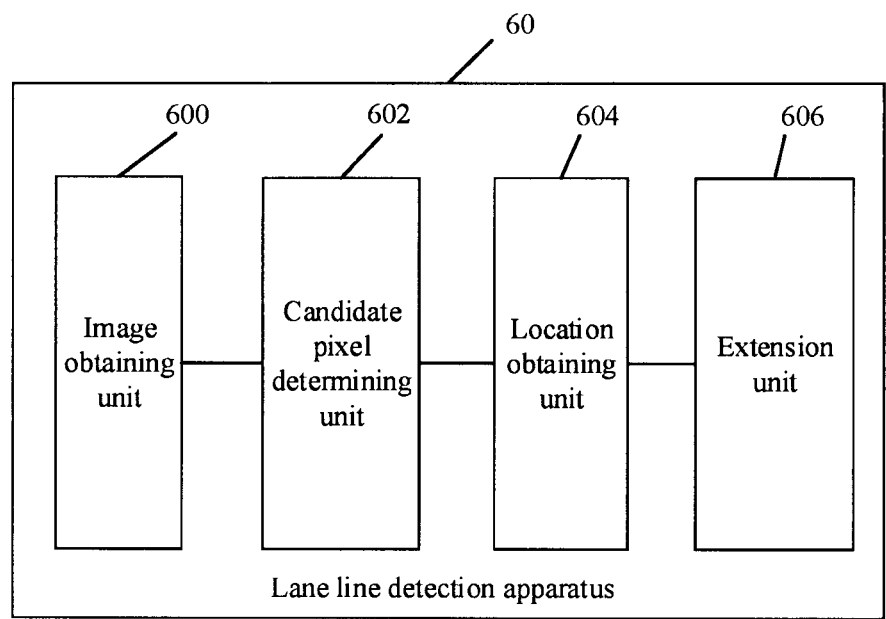
FIG. 6 is a schematic diagram of a structure of a lane line detection apparatus according to an embodiment of this application.

FIG. 6 is a schematic diagram of a structure of a lane line detection apparatus 60 according to an embodiment of this application. The lane line detection apparatus 60 shown in FIG. 6 may include:

an image obtaining unit 600, configured to obtain a to-be-recognized lane line image;

a candidate pixel determining unit 602, configured to determine, based on the lane line image, a candidate pixel used to recognize a lane line region, to obtain a candidate point set, where the lane line region is a region of a location of a lane line in the lane line image and a surrounding region of the location of the lane line;

a location obtaining unit 604, configured to select a target pixel from the candidate point set, and obtain at least three location points associated with the target pixel in a neighborhood, where the at least three location points are on one lane line; and an extension unit 606, configured to perform extension by using the target pixel as a start point and based on the at least three location points associated with the target pixel, to obtain a lane line point set corresponding to the target pixel.

In an embodiment, the candidate pixel determining unit 602 is configured to:

generate a confidence map of the lane line image, where the confidence map includes a confidence value of each pixel in the lane line image, and the confidence value indicates a confidence of each pixel in the lane line image belonging to the lane line region; and determine, in the confidence map, the candidate pixel used to recognize the lane line region.

In an embodiment, the at least three location points include a first location point, a second location point, and a third location point, N rows above a pixel row in which the target pixel is located are pixel rows in which the first location point is located, the pixel row in which the target pixel is located is the same as that in which the second location point is located, M rows under the pixel row in which the target pixel is located are pixel rows in which the third location point is located, M and N are integers greater than 0, and the extension unit 606 is configured to:

adjust a start location of the target pixel based on a first offset, to obtain a final location of the target pixel, where the first offset is an offset from the target pixel to the second location point;

obtain, by using the final location of the target pixel as a start point, a first lane line point that is obtained by performing extension on the target pixel based on a second offset, and obtain a second lane line point that is obtained by performing extension on the target pixel based on a third offset, where the second offset is an offset from the target pixel to the first location point, and the third offset is an offset from the target pixel to the third location point;

when a confidence value corresponding to the first lane line point is greater than a first confidence value, perform, by using the first lane line point as a current target pixel, an operation of obtaining a first lane line point that is obtained by performing extension on the target pixel based on the first offset and the second offset, until a confidence value corresponding to a first lane line point obtained through extension is not greater than the first confidence value; and when a confidence value corresponding to the second lane line point is greater than the first confidence value, perform, by using the second lane line point as a current target pixel, an operation of obtaining a second lane line point that is obtained by performing extension on the target pixel based on the first offset and the third offset, until a confidence value corresponding to a second lane line point obtained through extension is not greater than the first confidence value.

In an embodiment, the location obtaining unit 604 includes a pixel selection unit, where the pixel selection unit is configured to select a target pixel row from the lane line image based on the confidence map, where the target pixel row is a pixel row that has a largest quantity of target confidence maximums in a neighborhood in which a first pixel is located, the first pixel is a pixel whose confidence value is greater than a second confidence threshold, the target confidence maximum is greater than the second confidence threshold, the confidence map includes the confidence value of each pixel in the lane line image, and the confidence value indicates the confidence of each pixel in the lane line image belonging to the lane line region; and select, from the target pixel row as the target pixel, all pixels whose confidence values are greater than the second confidence value, or select, as the target pixel, a pixel whose confidence value is greater than the second confidence value and that corresponds to a confidence maximum in a neighborhood.

In an embodiment, the location obtaining unit 604 includes a pixel selection unit, where the pixel selection unit is configured to select a target pixel row from the lane line image based on the confidence map, where the target pixel row is a plurality of pixel rows in which a quantity of second pixels is greater than a target value, the second pixel is a pixel whose confidence value is greater than a second confidence threshold, the confidence map includes the confidence value of each pixel in the lane line image, and the confidence value indicates the confidence of each pixel in the lane line image belonging to the lane line region; and select, from the target pixel row as the target pixel, all pixels whose confidence values are greater than the second confidence value.

In an embodiment, when the target pixel comes from a plurality of pixel rows, the apparatus 60 further includes a deduplication unit 608, configured to: obtain an intersection over union between every two lane line point sets; and if the intersection over union between every two lane line point sets is greater than a target threshold, delete either of the every two lane line point sets.

In an embodiment of the application, for implementations of the units, refer to related descriptions in the foregoing embodiments. Details are not described herein again.

In an embodiment of the application, a lane line detection device may obtain, by using the target pixel as a start point and based on the at least three locations associated with the target pixel, other instance points of the lane line that are obtained by extending the target pixel, and then obtain the lane line point set. In this implementation, the lane line in the lane line image can be quickly and accurately recognized.

Figure 7:
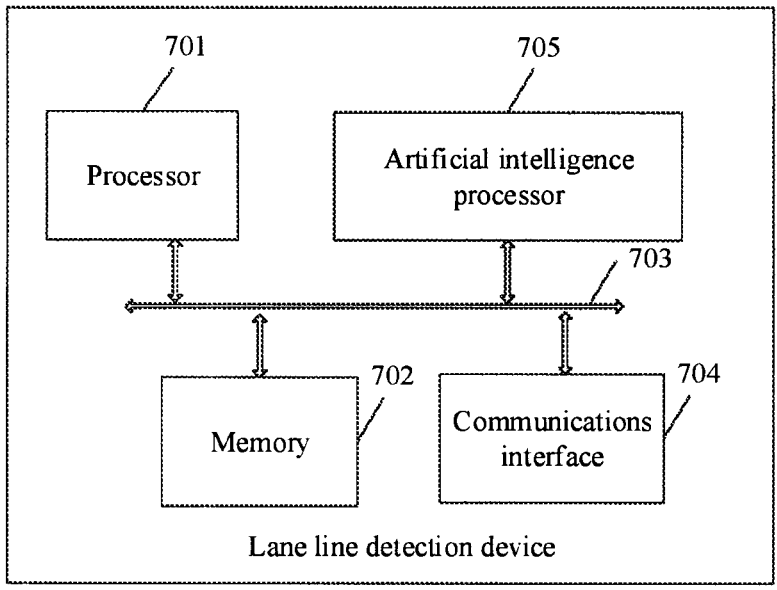
FIG. 7 is a schematic diagram of a structure of a lane line detection device according to an embodiment of this application.

As shown in FIG. 7, an embodiment of this application provides a lane line detection device 70. The lane line detection device may include a processor 701, a memory 702, a communications bus 703, and a communications interface 704. The processor 701 is connected to the memory 702 and the communications interface 703 by using the communications bus.

The processor 701 may be a general-purpose central processing unit (CPU), a microprocessor, an application-specific integrated circuit (ASIC), a graphics processing unit (GPU), a neural processing unit (NPU), or one or more integrated circuits, and is configured to execute a related program, to perform the lane line detection method described in the method embodiments of this application.

The processor 701 may alternatively be an integrated circuit chip and has a signal processing capability. In an implementation process, the operations of the lane line detection method of this application may be implemented by using a hardware integrated logical circuit in the processor 701, or by using instructions in a form of software. The processor 701 may alternatively be a general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the operations, and logical block diagrams that are disclosed in embodiments of this application. The general-purpose processor may be a microprocessor, or the processor may be any conventional processor or the like. The operations of the methods disclosed with reference to embodiments of this application may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 701. The processor 701 reads information in the memory 702, and performs, in combination with hardware of the processor 701, the lane line detection method in the method embodiments of this application.

The memory 702 may be a read-only memory (ROM), a static storage device, a dynamic storage device, or a random access memory (RAM). The memory 702 may store a program and data, for example, a program for the lane line detection method in embodiments of this application. When the program stored in the memory 701 is executed by the processor 702, the processor 701 and the communications interface 704 are configured to perform the operations of the lane line detection method in embodiments of this application.

For example, a program, in an embodiment of the application, that is used to implement the lane line detection method in embodiments of this application.

The communications interface 704 uses a transceiver apparatus, for example, but not limited to, a transceiver, to implement communication between a lane line detection device 700 and another device or a communications network. For example, a trained neural network may be obtained by using the communications interface 704, to exchange information with an execution device, a client device, user equipment, a terminal device, or the like.

In an embodiment, the lane line detection device may further include an artificial intelligence processor 705. The artificial intelligence processor 705 may be any processor suitable for large-scale exclusive OR operation processing, for example, a neural processing unit (NPU), a tensor processing unit (TPU), or a graphics processing unit (GPU). The artificial intelligence processor 705 may be mounted to a host CPU as a coprocessor, and the host CPU allocates a task to the artificial intelligence processor 705. The artificial intelligence processor 705 may implement one or more operations in the foregoing lane line detection method. For example, the NPU is used as an example. A core part of the NPU is an operation circuit, and a controller controls the operation circuit to extract matrix data in the memory 702 and perform a multiply-accumulate operation.

The processor 701 is configured to invoke data and program code stored in the memory to perform the following operations:

obtaining a to-be-recognized lane line image;

determining, based on the lane line image, a candidate pixel used to recognize a lane line region, to obtain a candidate point set, where the lane line region is a region including a location of a lane line in the lane line image and a surrounding region of the location of the lane line;

selecting a target pixel from the candidate point set, and obtaining at least three location points associated with the target pixel in a neighborhood, where the at least three location points are on one lane line; and performing extension by using the target pixel as a start point and based on the at least three location points associated with the target pixel, to obtain a lane line point set corresponding to the target pixel.

That the processor 701 determines, based on the lane line image, the candidate pixel used to recognize the lane line region, to obtain the candidate point set includes:

generating a confidence map of the lane line image, where the confidence map includes a confidence value of each pixel in the lane line image, and the confidence value indicates a confidence of each pixel in the lane line image belonging to the lane line region; and determining, in the confidence map, the candidate pixel used to recognize the lane line region.

The at least three location points include a first location point, a second location point, and a third location point. N rows above a pixel row in which the target pixel is located are pixel rows in which the first location point is located. The pixel row in which the target pixel is located is the same as that in which the second location point is located. M rows under the pixel row in which the target pixel is located are pixel rows in which the third location point is located. M and N are integers greater than 0. That the processor 701 performs extension by using the target pixel as a start point and based on the at least three location points associated with the target pixel includes:

adjusting a start location of the target pixel based on a first offset, to obtain a final location of the target pixel, where the first offset is an offset from the target pixel to the second location point;

obtaining, by using the final location of the target pixel as a start point, a first lane line point that is obtained by performing extension on the target pixel based on a second offset, and obtaining a second lane line point that is obtained by performing extension on the target pixel based on a third offset, where the second offset is an offset from the target pixel to the first location point, and the third offset is an offset from the target pixel to the third location point;

when a confidence value corresponding to the first lane line point is greater than a first confidence value, performing, by using the first lane line point as a current target pixel, an operation of obtaining a first lane line point that is obtained by performing extension on the target pixel based on the first offset and the second offset, until a confidence value corresponding to a first lane line point obtained through extension is not greater than the first confidence value; and when a confidence value corresponding to the second lane line point is greater than the first confidence value, performing, by using the second lane line point as a current target pixel, an operation of obtaining a second lane line point that is obtained by performing extension on the target pixel based on the first offset and the third offset, until a confidence value corresponding to a second lane line point obtained through extension is not greater than the first confidence value.

The at least three location points include a fourth location point and a fifth location point. N rows above a pixel row in which the target pixel is located are pixel rows in which the fourth location point is located. M rows under the pixel row in which the target pixel is located are pixel rows in which the fifth location point is located. M and N are integers greater than 0. That the processor 701 performs extension by using the target pixel as a start point and based on the at least three location points associated with the target pixel includes:

obtaining, by using a start location of the target pixel as a start point, a third lane line point that is obtained by performing extension on the target pixel based on a fourth offset, and obtaining a fourth lane line point that is obtained by performing extension on the target pixel based on a fifth offset, where the fourth offset is an offset from the target pixel to the fourth location point, and the fifth offset is an offset from the target pixel to the fifth location point;

when a confidence value corresponding to the third lane line point is greater than a first confidence value, performing, by using the third lane line point as a current target pixel, an operation of obtaining a third lane line point that is obtained by performing extension on the target pixel based on the fourth offset, until a confidence value corresponding to a third lane line point obtained through extension is not greater than the first confidence value; and when a confidence value corresponding to the fourth lane line point is greater than the first confidence value, performing, by using the fourth lane line point as a current target pixel, an operation of obtaining a fourth lane line point that is obtained by performing extension on the target pixel based on the fifth offset, until a confidence value corresponding to a fourth lane line point obtained through extension is not greater than the first confidence value.

The at least three location points include a sixth location point, a seventh location point, and an eighth location point. N rows above a pixel row in which the target pixel is located are pixel rows in which the sixth location point is located. The pixel row in which the target pixel is located is the same as that in which the seventh location point is located. M rows under the pixel row in which the target pixel is located are pixel rows in which the eighth location point is located. M and N are integers greater than 0. That the processor 701 performs extension by using the target pixel as a start point and based on the at least three location points associated with the target pixel includes:

adjusting a start location of the target pixel by using the target pixel as a start point and based on a sixth offset, to obtain a sixth lane line point, where the sixth offset is an offset from the target pixel to the seventh location point;

obtaining a candidate pixel closest to the sixth location point based on a seventh offset, to obtain a seventh lane line point, and obtaining an eighth lane line point that is obtained by performing extension on the seventh lane line point based on the sixth offset; and obtaining a candidate pixel closest to the eighth location point based on an eighth offset, to obtain a ninth lane line point, and obtaining a tenth lane line point that is obtained by performing extension on the ninth lane line point based on the sixth offset, where the sixth lane line point, the eighth lane line point, and the tenth lane line point are used to constitute the lane line point set corresponding to the target pixel.

That the processor 701 selects the target pixel from the candidate point set includes:

selecting a target pixel row from the lane line image based on the confidence map, where the target pixel row is a pixel row that has a largest quantity of target confidence maximums in a neighborhood in which a first pixel is located, the first pixel is a pixel whose confidence value is greater than a second confidence threshold, the target confidence maximum is greater than the second confidence threshold, the confidence map includes the confidence value of each pixel in the lane line image, and the confidence value indicates the confidence of each pixel in the lane line image belonging to the lane line region; and selecting, from the target pixel row as the target pixel, all pixels whose confidence values are greater than the second confidence value, or selecting, as the target pixel, a pixel whose confidence value is greater than the second confidence value and that corresponds to a confidence maximum in a neighborhood.

That the processor 701 selects the target pixel from the candidate point set includes:

selecting a target pixel row from the lane line image based on the confidence map, where the target pixel row is a plurality of pixel rows in which a quantity of second pixels is greater than a target value, the second pixel is a pixel whose confidence value is greater than a second confidence threshold, the confidence map includes the confidence value of each pixel in the lane line image, and the confidence value indicates the confidence of each pixel in the lane line image belonging to the lane line region; and selecting, from the target pixel row as the target pixel, all pixels whose confidence values are greater than the second confidence value.

When the target pixel comes from a plurality of pixel rows, the processor 701 may be further configured to:

obtain an intersection over union between every two lane line point sets; and if the intersection over union between every two lane line point sets is greater than a target threshold, delete either of the every two lane line point sets.

It should be understood that, for implementation of each component, reference may be further made to corresponding descriptions in the foregoing embodiments of the lane line detection method. Details are not described again in an embodiment of the application.

An embodiment of this application further provides a computer-readable storage medium. The computer-readable storage medium is configured to store a computer program that implements convolution of two high-order digits based on the Karatsuba algorithm. The computer program enables an electronic device to perform some or all of operations of any convolution operation method described in the foregoing method embodiments.

An embodiment of this application further provides a computer program product. The computer program product includes a non-transitory computer-readable storage medium storing a computer program. The computer program is operable to enable an electronic device to perform some or all of the operations of any convolution operation method described in the foregoing method embodiments.

It may be understood that one of ordinary skilled in the art may be aware that, in combination with the examples described in embodiments disclosed in this application, units and algorithm operations may be implemented by electronic hardware or a combination of computer software and electronic hardware. Whether the functions are performed by hardware or software depends on particular applications and design constraint conditions of the technical solutions. One of ordinary skilled in the art may use different methods to implement the described functions for each particular application, but it should not be considered that the implementation goes beyond the scope of this application.

One of ordinary skilled in the art can understand that functions described with reference to various illustrative logical blocks, modules, and algorithm operations disclosed in embodiments of this application may be implemented by hardware, software, firmware, or any combination thereof. If implemented by software, the functions described with reference to the illustrative logical blocks, modules, and operations may be stored in or transmitted over a computer-readable medium as one or more instructions or code and executed by a hardware-based processing unit. The computer-readable medium may include a computer-readable storage medium, which corresponds to a tangible medium such as a data storage medium, or may include any communications medium that facilitates transmission of a computer program from one place to another (for example, according to a communications protocol). In this manner, the computer-readable medium may generally correspond to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

It may be clearly understood by one of ordinary skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in the embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the operations of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely implementations of this application, but are not intended to limit the protection scope of this application. Any variation or replacement readily figured out by one of ordinary skilled in the art within the technical scope disclosed in this application shall fall within the protection scope of this application. Therefore, the protection scope of this application shall be subject to the protection scope of the claims.

What is claimed is:

1. A lane line detection method, comprising: obtaining a lane line image; determining, based on the lane line image, a candidate pixel used to recognize a lane line region, to obtain a candidate point set, wherein the lane line region comprises a location of a lane line in the lane line image and a surrounding region of the location of the lane line; selecting a target pixel row from the lane line image based on a confidence map, wherein the target pixel row has a largest quantity of target confidence maximums in a neighborhood in which a first pixel is located, the first pixel is a pixel whose confidence value is greater than a second confidence threshold, each of the target confidence maximums are greater than the second confidence threshold, the confidence map comprises the confidence value of each pixel in the lane line image, and the confidence value indicates confidence of each pixel in the lane line image belonging to the lane line region; selecting, from the target pixel row as a target pixel, all pixels whose confidence values are greater than the second confidence threshold, or selecting, as the target pixel, a pixel whose confidence value is greater than the second confidence threshold corresponding to a confidence maximum in a neighborhood; selecting a target pixel from the candidate point set, and obtaining at least three location points associated with the target pixel in a neighborhood, wherein the at least three location points are on one lane line; and performing extension by using the target pixel as a start point and the at least three location points associated with the target pixel, to obtain a lane line point set corresponding to the target pixel.

2. The method according to claim 1, wherein the determining the candidate pixel used to recognize the lane line region, to obtain the candidate point set comprises:

generating the confidence map of the lane line image, wherein the confidence map comprises a confidence value of each pixel in the lane line image, and wherein the confidence value indicates a confidence of each pixel in the lane line image belonging to the lane line region; and determining, in the confidence map, the candidate pixel used to recognize the lane line region.

3. The method according to claim 1, wherein the at least three location points comprise a first location point, a second location point, and a third location point; N rows above a pixel row in which the target pixel is located are pixel rows in which the first location point is located; the pixel row in which the target pixel is located is the same as the pixel row in which the second location point is located; M rows under the pixel row in which the target pixel is located are pixel rows in which the third location point is located; M and N are integers greater than 0; and wherein the performing extension by using the target pixel as the start point and the at least three location points associated with the target pixel comprises:

adjusting a start location of the target pixel based on a first offset, to obtain a new pixel, wherein the first offset is from the target pixel to the second location point; and replacing the target pixel with the new pixel to obtain a final location of the target pixel;

obtaining, by using the final location of the target pixel as a start point, a first lane line point obtained by performing extension on the target pixel based on a second offset, and obtaining a second lane line point obtained by performing extension on the target pixel based on a third offset, wherein the second offset is from the target pixel to the first location point, and the third offset is from the target pixel to the third location point;

when a confidence value corresponding to the first lane line point is greater than a first confidence value, performing, by using the first lane line point as a current target pixel, an operation of obtaining a new first lane line point obtained by performing extension on the target pixel based on the second offset, until a confidence value corresponding to the new first lane line point obtained through extension is not greater than the first confidence value; and when a confidence value corresponding to the second lane line point is greater than the first confidence value, performing, by using the second lane line point as a current target pixel, an operation of obtaining a new second lane line point obtained by performing extension on the target pixel based on the third offset, until a confidence value corresponding to the new second lane line point obtained through extension is not greater than the first confidence value.

4. The method according to claim 3, wherein the selecting the target pixel from the candidate point set comprises:

selecting a target pixel row from the lane line image based on the confidence map, wherein the target pixel row is a plurality of pixel rows in which a quantity of second pixels is greater than a target value, the second pixel is a pixel whose confidence value is greater than a second confidence threshold, the confidence map comprises the confidence value of each pixel in the lane line image, and the confidence value indicates the confidence of each pixel in the lane line image belonging to the lane line region; and selecting, from the target pixel row as the target pixel, all pixels whose confidence values are greater than the second confidence threshold.

5. The method according to claim 4, wherein when the target pixel comes from the plurality of pixel rows, the method further comprises:

obtaining an intersection over union between two lane line point sets; and if the intersection over union between the two lane line point sets is greater than a target threshold, deleting either of the two lane line point sets.

6. A lane line detection apparatus, comprising: a processor; and a memory coupled to the processor to store instructions, which when executed by the processor, cause the apparatus to perform operations, the operations comprising: obtaining a lane line image; determining, based on the lane line image, a candidate pixel used to recognize a lane line region, to obtain a candidate point set, wherein the lane line region comprises a location of a lane line in the lane line image and a surrounding region of the location of the lane line; selecting a target pixel row from the lane line image based on a confidence map, wherein the target pixel row has a largest quantity of target confidence maximums in a neighborhood in which a first pixel is located, the first pixel is a pixel whose confidence value is greater than a second confidence threshold, each of the target confidence maximums are greater than the second confidence threshold, the confidence map comprises the confidence value of each pixel in the lane line image, and the confidence value indicates confidence of each pixel in the lane line image belonging to the lane line region; selecting, from the target pixel row as a target pixel, all pixels whose confidence values are greater than the second confidence threshold, or selecting, as the target pixel, a pixel whose confidence value is greater than the second confidence threshold corresponding to a confidence maximum in a neighborhood; obtain at least three location points associated with the target pixel in a neighborhood, wherein the at least three location points are on one lane line; and performing extension by using the target pixel as a start point and the at least three location points associated with the target pixel, to obtain a lane line point set corresponding to the target pixel.

7. The apparatus according to claim 6, wherein the operations further comprise:

generating the confidence map of the lane line image, wherein the confidence map comprises a confidence value of each pixel in the lane line image, and wherein the confidence value indicates a confidence of each pixel in the lane line image belonging to the lane line region; and determining, in the confidence map, the candidate pixel used to recognize the lane line region.

8. The apparatus according to claim 6, wherein the at least three location points comprise a first location point, a second location point, and a third location point; N rows above a pixel row in which the target pixel is located are pixel rows in which the first location point is located; the pixel row in which the target pixel is located is the same as the pixel row in which the second location point is located; M rows under the pixel row in which the target pixel is located are pixel rows in which the third location point is located; M and N are integers greater than 0; and wherein programming instructions instruct the processor to perform:

adjusting a start location of the target pixel based on a first offset, to obtain a new pixel, wherein the first offset is from the target pixel to the second location point; and replacing the target pixel with the new pixel to obtain a final location of the target pixel;

obtaining, by using the final location of the target pixel as a start point, a first lane line point obtained by performing extension on the target pixel based on a second offset, and obtain a second lane line point obtained by performing extension on the target pixel based on a third offset, wherein the second offset is from the target pixel to the first location point, and the third offset is from the target pixel to the third location point;

when a confidence value corresponding to the first lane line point is greater than a first confidence value, performing, by using the first lane line point as a current target pixel, an operation of obtaining a new first lane line point obtained by performing extension on the target pixel based on the second offset, until a confidence value corresponding to the new first lane line point obtained through extension is not greater than the first confidence value; and when a confidence value corresponding to the second lane line point is greater than the first confidence value, performing, by using the second lane line point as a current target pixel, an operation of obtaining a new second lane line point obtained by performing extension on the target pixel based on the third offset, until a confidence value corresponding to the new second lane line point obtained through extension is not greater than the first confidence value.

9. The apparatus according to claim 6, wherein the operations further comprise:

selecting a target pixel row from the lane line image based on the confidence map, wherein the target pixel row is a plurality of pixel rows in which a quantity of second pixels is greater than a target value, the second pixel is a pixel whose confidence value is greater than a second confidence threshold, the confidence map comprises the confidence value of each pixel in the lane line image, and the confidence value indicates the confidence of each pixel in the lane line image belonging to the lane line region; and selecting, from the target pixel row as the target pixel, all pixels whose confidence values are greater than the second confidence threshold.

10. The apparatus according to claim 9, wherein when the target pixel comes from the plurality of pixel rows, the operations further comprise:

obtaining an intersection over union between two lane line point sets; and if the intersection over union between the two lane line point sets is greater than a target threshold, deleting either of the two lane line point sets.

11. A non-transitory computer-readable storage medium having instructions stored therein, which when executed by a processor, cause an apparatus to perform operations, the operations comprising: obtaining a lane line image; determining, based on the lane line image, a candidate pixel used to recognize a lane line region, to obtain a candidate point set, wherein the lane line region comprises a location of a lane line in the lane line image and a surrounding region of the location of the lane line; selecting a target pixel row from the lane line image based on a confidence map, wherein the target pixel row has a largest quantity of target confidence maximums in a neighborhood in which a first pixel is located, the first pixel is a pixel whose confidence value is greater than a second confidence threshold, each of the target confidence maximums are greater than the second confidence threshold, the confidence map comprises the confidence value of each pixel in the lane line image, and the confidence value indicates confidence of each pixel in the lane line image belonging to the lane line region; selecting, from the target pixel row as a target pixel, all pixels whose confidence values are greater than the second confidence threshold, or selecting, as the target pixel, a pixel whose confidence value is greater than the second confidence threshold corresponding to a confidence maximum in a neighborhood; obtaining at least three location points associated with the target pixel in a neighborhood, wherein the at least three location points are on one lane line; and performing extension by using the target pixel as a start point and the at least three location points associated with the target pixel, to obtain a lane line point set corresponding to the target pixel.

12. The non-transitory computer-readable storage medium according to claim 11, wherein the operations further comprise:

generating the confidence map of the lane line image, wherein the confidence map comprises a confidence value of each pixel in the lane line image, and wherein the confidence value indicates a confidence of each pixel in the lane line image belonging to the lane line region; and determining, in the confidence map, the candidate pixel used to recognize the lane line region.

13. The non-transitory computer-readable storage medium according to claim 11, wherein the at least three location points comprise a first location point, a second location point, and a third location point; N rows above a pixel row in which the target pixel is located are pixel rows in which the first location point is located; the pixel row in which the target pixel is located is the same as the pixel row in which the second location point is located;

M rows under the pixel row in which the target pixel is located are pixel rows in which the third location point is located; M and N are integers greater than 0; and wherein programming instructions instruct the processor to perform:

adjusting a start location of the target pixel based on a first offset, to obtain a new pixel, wherein the first offset is from the target pixel to the second location point; and replacing the target pixel with the new pixel to obtain a final location of the target pixel;

obtaining, by using the final location of the target pixel as a start point, a first lane line point obtained by performing extension on the target pixel based on a second offset, and obtain a second lane line point obtained by performing extension on the target pixel based on a third offset, wherein the second offset is from the target pixel to the first location point, and the third offset is from the target pixel to the third location point;

when a confidence value corresponding to the first lane line point is greater than a first confidence value, performing, by using the first lane line point as a current target pixel, an operation of obtaining a new first lane line point obtained by performing extension on the target pixel based on the second offset, until a confidence value corresponding to the new first lane line point obtained through extension is not greater than the first confidence value; and when a confidence value corresponding to the second lane line point is greater than the first confidence value, performing, by using the second lane line point as a current target pixel, an operation of obtaining a new second lane line point obtained by performing extension on the target pixel based on the third offset, until a confidence value corresponding to the new second lane line point obtained through extension is not greater than the first confidence value.

14. The non-transitory computer-readable storage medium according to claim 11, wherein the operations further comprise:

selecting a target pixel row from the lane line image based on the confidence map, wherein the target pixel row is a plurality of pixel rows in which a quantity of second pixels is greater than a target value, the second pixel is a pixel whose confidence value is greater than a second confidence threshold, the confidence map comprises the confidence value of each pixel in the lane line image, and the confidence value indicates the confidence of each pixel in the lane line image belonging to the lane line region; and selecting, from the target pixel row as the target pixel, all pixels whose confidence values are greater than the second confidence threshold.

15. The non-transitory computer-readable storage medium according to claim 14, wherein when the target pixel comes from the plurality of pixel rows, the operations further comprise:

obtaining an intersection over union between two lane line point sets; and if the intersection over union between the two lane line point sets is greater than a target threshold, deleting either of the two lane line point sets.

\* \* \* \* \*